US008260544B2

(12) United States Patent
Kawa

(10) Patent No.: US 8,260,544 B2
(45) Date of Patent: Sep. 4, 2012

(54) MOBILE BODY NAVIGATION SYSTEM, NAVIGATION APPARATUS AND SERVER APPARATUS

(75) Inventor: Noriaki Kawa, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 667 days.

(21) Appl. No.: 12/343,598

(22) Filed: Dec. 24, 2008

(65) Prior Publication Data

US 2009/0210152 A1 Aug. 20, 2009

(30) Foreign Application Priority Data

Feb. 15, 2008 (JP) ................................ 2008-034688

(51) Int. Cl.
*G01C 21/30* (2006.01)
(52) U.S. Cl. ........................................................ 701/409
(58) Field of Classification Search ........ 705/6; 701/33, 701/35, 110, 119, 200, 211, 202, 1
See application file for complete search history.

(56) References Cited

U.S. PATENT DOCUMENTS

| 6,505,165 | B1* | 1/2003 | Berstis et al. ...................... 705/6 |
| 7,085,629 | B1* | 8/2006 | Gotou et al. ....................... 701/1 |
| 2001/0037305 | A1 | 11/2001 | Mochizuki | |
| 2003/0045997 | A1* | 3/2003 | Nakane et al. ................. 701/202 |
| 2004/0143378 | A1* | 7/2004 | Vogelsang ...................... 701/35 |
| 2004/0207541 | A1 | 10/2004 | Choi | |
| 2006/0052921 | A1* | 3/2006 | Bodin et al. .................... 701/33 |
| 2006/0184307 | A1* | 8/2006 | Kosaka .......................... 701/110 |
| 2006/0271286 | A1* | 11/2006 | Rosenberg .................... 701/211 |
| 2008/0097688 | A1* | 4/2008 | Tashev et al. ................. 701/200 |
| 2008/0255754 | A1* | 10/2008 | Pinto ............................. 701/119 |

FOREIGN PATENT DOCUMENTS

| CN | 1321874 A | 11/2001 |
| CN | 1540290 A | 10/2004 |
| JP | 05-142994 | 6/1993 |
| JP | 05-272983 | 10/1993 |
| JP | 07-055484 | 3/1995 |
| JP | 08-095488 | 4/1996 |
| JP | 2003-317193 A | 11/2003 |
| JP | 2005-285082 A | 10/2005 |
| JP | 2005-337863 A | 12/2005 |
| JP | 2007-255996 | 10/2007 |

* cited by examiner

*Primary Examiner* — Valerie Lubin
(74) *Attorney, Agent, or Firm* — Nixon & Vanderhye P.C.

(57) ABSTRACT

A mobile-body navigation system comprises;
a navigation apparatus that is disposed in a mobile body and includes a position detection portion for detecting a position of the mobile body, a transmitter-receiver portion, a processing portion, a display portion, and a storage medium;
a radio communication apparatus for carrying out interactive radio communication with the transmitter-receiver portion; and
a server apparatus that includes a map information database;
wherein the server apparatus repeats extraction of high-priority map information for map display from the map information database based on a mobile-body position that is detected by the position detection portion and received via the transmitter-receiver portion and via the radio communication apparatus, and repeats transmission of the extracted map information to the transmitter-receiver portion via the radio communication apparatus,
the processing portion receives the map information via the transmitter-receiver portion, makes the storage medium store the received map information, and makes the display portion display a map based on the stored map information and on the mobile-body position detected by the position detection portion.

2 Claims, 15 Drawing Sheets

MOBILE BODY NAVIGATION SYSTEM, NAVIGATION APPARATUS AND SERVER APPARATUS

This application is based on Japanese Patent Application No. 2008-034688 filed on Feb. 15, 2008, the contents of which are hereby incorporated by reference.

BACKGROUND OF THE INVENTION

1. Field of the Invention

The present invention relates to a mobile-body navigation system, a navigation apparatus, and a server apparatus.

2. Description of the Prior Art

Conventionally, a car navigation apparatus uses map information saved in a storage medium such as a hard disc and the like that is incorporated in the apparatus to carry out navigation operation (e.g., see JP-A-1996-95488, JP-A-1993-142994, JP-A-1993-272983, JP-A-1995-55484, and JP-A-2007-255996).

However, in the conventional car navigation apparatus, there is a problem that it is necessary to store all the map information in the storage medium and the capacity of the storage medium becomes very large. Besides, the map information cannot be updated everyday, and it is hard to always use the latest map information to carry out navigation. In addition, because the entire map information is saved in the storage medium, there is a risk that the entire map information is illegally duplicated.

SUMMARY OF THE INVENTION

The present invention has been made, at least in part, to cope with the conventional problems, and it is an object of the present invention to provide a mobile-body navigation system, a navigation apparatus and a server apparatus that achieve navigation service using always the latest map information and allow a dramatic capacity reduction of a storage medium of a navigation apparatus.

To achieve the object, a mobile-body navigation system according to an aspect of the present invention comprises:

a navigation apparatus that is disposed in a mobile body and includes a position detection portion for detecting a position of the mobile body, a transmitter-receiver portion, a processing portion, a display portion, and a storage medium;

a radio communication apparatus for carrying out interactive radio communication with the transmitter-receiver portion; and a server apparatus that includes a map information database;

wherein the server apparatus repeats extraction of high-priority map information for map display from the map information database based on a mobile-body position that is detected by the position detection portion and received via the transmitter-receiver portion and via the radio communication apparatus, and repeats transmission of the extracted map information to the transmitter-receiver portion via the radio communication apparatus, the processing portion receives the map information via the transmitter-receiver portion, makes the storage medium store the received map information, and makes the display portion display a map based on the stored map information and on the mobile-body position detected by the position detection portion.

According to this structure, because there is the map information database on the server apparatus side, it is possible to achieve navigation service using always the latest map information. Besides, because only map information that is needed at the moment is stored into the storage medium of the navigation apparatus and is used for navigation, it is possible to reduce dramatically the storage medium capacity. In addition, the map information can be stored in the storage medium as local data, it is possible to prevent illegal duplication the entire database.

In the mobile-body navigation system according to an aspect of the present invention having the above structure, the processing portion transmits destination information to the radio communication apparatus via the transmitter-receiver portion, the server apparatus receives the destination information via the radio communication apparatus, searches for a route based on the received destination information and on the received mobile-body position, and transmits a route search result to the transmitter-receiver portion via the radio communication apparatus, and the processing portion receives the route search result via the transmitter-receiver portion, makes the storage medium store the route search result, and makes the display portion display a route based on the route search result stored in the storage medium.

According to this structure, because the route search is carried out by the server apparatus, a high-end route search processor and an enormous database are not needed in the navigation apparatus, and it is possible to use a low-capability processor and a small-capacity storage medium, which allows cost reduction of the navigation apparatus.

In the mobile-body navigation system according to the present invention having the above structure, the navigation apparatus includes an operation portion, if map scale change operation is carried out on the operation portion during the time of the map display, the server apparatus repeats extraction of map information that has high priority and is changed in scale for map display from the map information database based on a mobile-body position that is detected by the position detection portion and received via the transmitter-receiver portion and via the radio communication apparatus, and repeats transmission of the extracted map information to the transmitter-receiver portion via the radio communication apparatus, the processing portion receives the map information via the transmitter-receiver portion, makes the storage medium store the received map information, and makes the display portion display a map based on the stored map information and on the mobile-body position detected by the position detection portion.

According to this structure, even if the user wants to change the map scale during navigation, it is possible to take advantage of navigation service using a map displayed in a changed map scale.

In the mobile-body navigation system according to the present invention having the above structure, after the server apparatus transmits the high-priority map information for map display, the server apparatus extracts high-priority map information for map display in a different scale from the map information database, and transmits the extracted map information to the transmitter-receiver portion via the radio communication apparatus, and the processing portion receives the map information via the transmitter-receiver portion, and makes the storage medium store the received map information.

According to this structure, even if the user wants to change the map scale during navigation, because the different-scale map information is already stored in the storage medium, quick map display in the different-map scale is possible, which gives no stress to the user.

In the mobile-body navigation system according to the present invention having the above structure, the transmitter-receiver portion and the radio communication apparatus communicate with each other in an always-on connection state without occupying a line. Thus, under a monthly-payment contract or the like for connection charge, it is generally possible to curb connection charge compared with the line occupation connection.

In the mobile-body navigation system according to the present invention having the above structure, each of contractor identification ID and contractor specification ID is able to be set to be or not to be transmittable from the navigation apparatus to the server apparatus, and if the contractor identification ID is set to be transmittable, the server apparatus confirms that the contractor is a proper contractor based on the contractor identification ID that is received from the processing portion via the transmitter-receiver portion and via the radio communication apparatus, and starts to extract and transmit the high-priority map information for the map display.

According to this structure, it becomes possible that the contractor specification ID is not transmitted to the server apparatus to avoid specification of the contractor for protection of the contractor's privacy, while the contractor identification ID is transmitted to the server apparatus for confirmation of a proper contractor to take advantage of the navigation service.

In the mobile-body navigation system according to the present invention having. the above structure, the navigation apparatus includes at least one kind of sensor, and the processing portion transmits information detected by the sensor to the radio communication apparatus via the transmitter-receiver portion, and the server apparatus receives and obtains the detected information via the radio communication apparatus.

According to this structure, even at a place where an information acquisition facility is not used, the information detected by the sensor is able to be acquired in real time from the navigation apparatus, thereby it becomes possible to provide various kinds of information service.

In the mobile-body navigation system according to the present invention having the above structure, if the processing portion receives a detected information request from the server apparatus via the radio communication apparatus and via the transmitter-receiver portion, the processing portion transmits the detected information. Thus, information acquisition is carried out at a request from the server apparatus, thereby it is possible to prevent communication concentration and traffic increase due to unnecessary information transmission.

In the mobile-body navigation system according to the present invention having the above structure, the server apparatus calculates a reward based on the obtained detected information, thereby it is possible to encourage positive and cooperative information acquisition from the navigation apparatus.

In the mobile-body navigation system having the above structure, each kind of the detected information is able to be set to be or not to be transmittable from the navigation apparatus to the server apparatus, thereby it becomes possible to carry out information delivery following the user's policy.

In the mobile-body navigation system according to the present invention having the above structure, if the server apparatus finds out based on the obtained detected information that the mobile body seems to be running on a road whose data are not shown on the map presented by the map information database, the server apparatus predicts a come-in road into which the mobile body comes from an existing road, transmits an take-image request to a navigation apparatus that has a camera and is disposed in a mobile body which is going to run by the predicted come-in road, and receives and obtains a taken image from the navigation apparatus that receives the image take request and takes the image of a condition of the road with the camera. Thus, it is possible to confirm the presence of the new road that is not shown in the map without going to the place, and data of the new road can be provided as original information.

In the mobile-body navigation system according to the present invention having the above structure, the server apparatus may be so structured that if the server locates based on the obtained detected information a road where a traffic jam (jam) is predicted to occur, the server transmits an take-image request to a navigation apparatus that has a camera and is disposed in a mobile body which is going to run or running on the road, and receives and obtains a taken image from the navigation apparatus that receives the take-image request and takes the mage of a condition of the road with the camera. Thus, it is possible to confirm the jam presence without going to the place, and data of the jam can be provided as original information.

In the mobile-body navigation system according to the present invention having the above structure, the at least one kind of sensor includes a temperature sensor and/or a humidity sensor, and at a request from another navigation apparatus, the server apparatus transmits obtained temperature information and/or humidity information to said another navigation apparatus. Thus, it is possible to share the temperature information and humidity information among the navigation apparatuses.

In the mobile-body navigation system according to the present invention having the above structure, the server apparatus transmits an take-image request to the navigation apparatus which has a camera and is disposed in a mobile body which is going to run or running by a building that seems to be changing from the condition shown in the map presented by the map information database, and receives and obtains a taken image from the navigation apparatus that receives the take-image request and takes the image of a condition of the building with the camera. Thus, it is possible to confirm a building condition change without going to the place, and data of the building condition change can be provided as original information.

In the mobile-body navigation system according to the present invention having the above structure, the navigation system includes a camera, the processing portion transmits an image of a sky condition taken by the camera to the radio communication apparatus via the transmitter-receiver apparatus, and the server apparatus receives and obtains the taken image via the radio communication apparatus and transmits the obtained taken image or weather information based on the obtained taken image to another navigation apparatus at a request from said another navigation apparatus. Thus, it is possible to share the weather information among the navigation apparatuses.

In the mobile-body navigation system according to the present invention having the above structure, the server apparatus simultaneously transmits warning information via the radio communication apparatus to a plurality of navigation apparatuses that are connected to the radio communication apparatus over radio. Thus, it is possible to transmit an emergency notice to the users.

In the mobile-body navigation system according to the present invention having the above structure, an embodiment is possible, in which the server apparatus transmits software to the transmitter-receiver portion via the radio communication apparatus, and the processing portion receives the software via the transmitter-receiver portion, makes the storage medium store the received software, and installs the stored software. Thus, it becomes possible to update user interface and the like.

In the mobile-body navigation system according to the present invention having the above structure, the navigation apparatus includes a fuel amount sensor and a notice portion, if the processing portion finds out that a fuel amount detected by the fuel sensor is equal to or less than a given amount, the processing portion transmits a fuel supply information request to the server apparatus via the transmitter-receiver portion and via the radio communication apparatus, the server apparatus receives the request, retrieves a fuel supply facility where it is predictably possible to reach within the business time on fuel of the current amount based on the fuel amount detected by the fuel amount sensor and on the business time information about fuel supply facilities that the server apparatus has, and transmits fuel supply information on the retrieved fuel supply facility to the transmitter-receiver portion via the radio communication apparatus, and the processing portion receives the fuel supply information via the transmitter-receiver portion, and makes the notice portion release a notice of choices of fuel supply means based on the received fuel supply information.

According to this structure, the user receives the notice of choices of fuel supply means, and surely can use the fuel supply facility. It is desirable that a service provider of each facility can register the business time information about the fuel supply facilities from a terminal over a line such as the Internet. Thus, the user can receive a notice of fuel supply information based on the latest business time information, and can use more surely a fuel supply facility.

In the mobile-body navigation system according to the present invention having the above structure, the navigation apparatus includes a notice portion and an operation portion if a given operation is carried out on the operation portion, the processing portion transmits a nearby available facility information request to the server apparatus via the transmitter-receiver portion and via the radio communication apparatus, the server apparatus receives the request, retrieves a nearby facility where it is predictably possible to reach within the business time based on the business time information about facilities that the server apparatus has, and transmits nearby available facility information on the retrieved nearby facility to the transmitter-receiver portion via the radio communication apparatus, and the processing portion receives the nearby available facility information via the transmitter-receiver portion, and makes the notice portion release a notice based on the nearby available facility information.

According to this structure, the user receives the notice of the nearby available facility information, and surely can use the nearby facility. It is desirable that a service provider of each facility can register the business time information about the facilities from a terminal over a line such as the Internet.

Thus, the user can receive a notice of nearby available facility information, and can use more surely a nearby facility.

A navigation apparatus according the present invention is disposed in a mobile body, and comprises a position detection portion and a storage medium, and transmits a map information request including a mobile-body position detected by the position detection portion to a server apparatus by radio communication; receives map information based on the mobile-body position from the server apparatus by radio communication; makes the storage medium store the received map information; and carries out map display based on the stored map information and on the mobile-body position detected by the position detection portion.

A server apparatus according to the present invention receives a map information request including a mobile-body position detected by a navigation apparatus from the navigation apparatus by radio communication, and transmits map information based on the received mobile-body position to the navigation apparatus by radio communication.

DESCRIPTION OF THE PREFERRED EMBODIMENTS

Hereinafter, embodiments of the present invention are explained with reference to the drawings.

Figure 1:
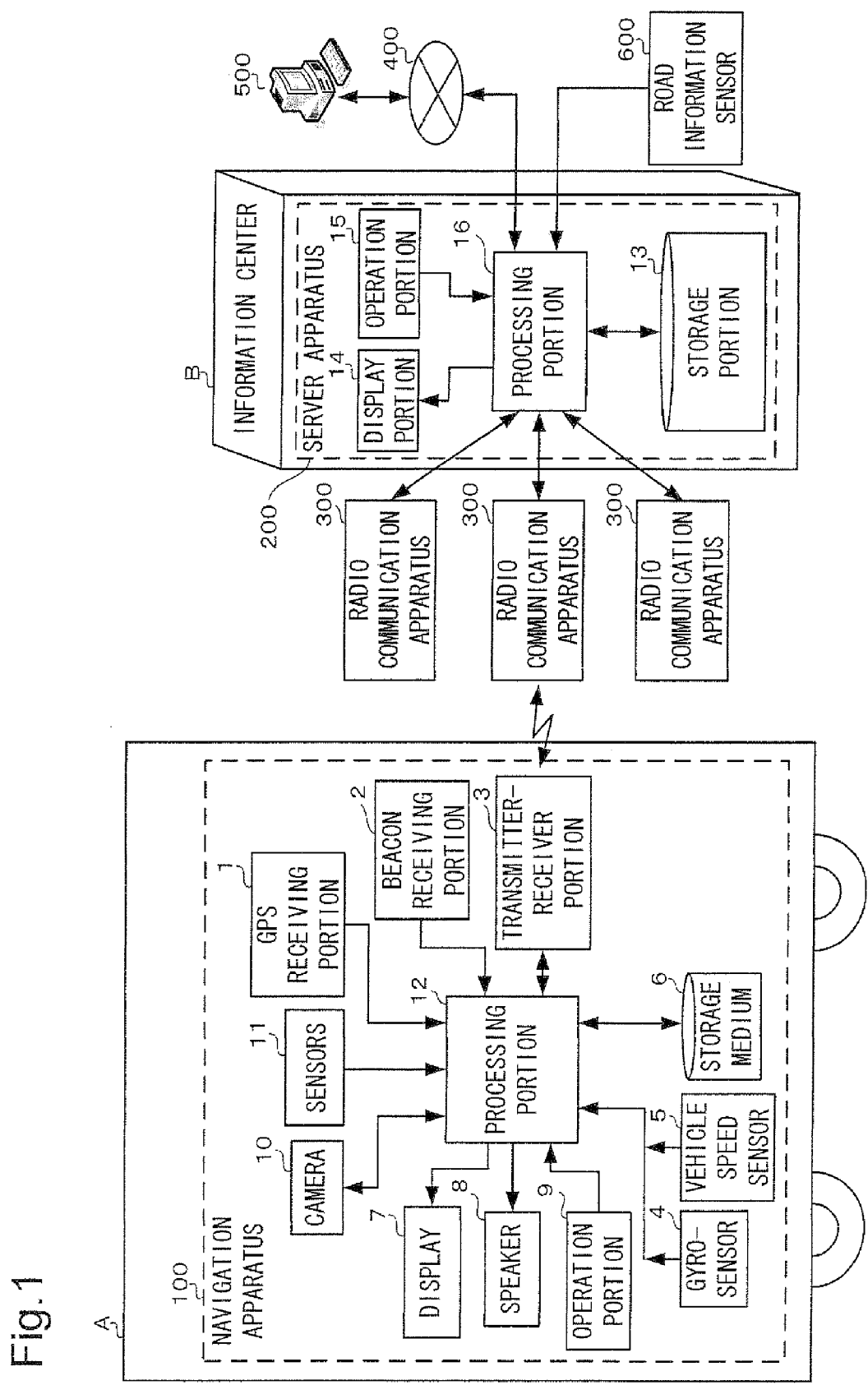
FIG. 1 is a structural view of a mobile-body navigation system according to an embodiment of the present invention.

FIG. 1 shows a structure of a mobile-body navigation system according to an embodiment of the present invention. A navigation apparatus 100 is incorporated in a vehicle A, and a server apparatus 200 is disposed in an information center B. Radio communication apparatuses 300 are disposed at various places, and are each connected to the server apparatus 200. Each radio communication apparatus 300 carries out interactive high-speed radio communication with a plurality of navigation apparatuses 100 (only one navigation apparatus is shown in FIG. 1 for convenience).

The navigation apparatus 100 comprises a GPS receiving portion 1, a beacon receiving portion 2, a transmitter-receiver portion 3, a gyro-sensor 4, a vehicle speed sensor 5, a storage medium 6, a display 7, a speaker 8, an operation portion 9, a camera 10, a sensors 11, and a processing portion 12.

The GPS receiving portion 1 receives a radio wave from a GPS satellite group and calculates a vehicle position. The beacon receiving portion 2 is a receiver to receive VICS beacon information (light and radio wave). The transmitter-receiver portion 3 converts various kinds of information from the processing portion 12 into radio signals and transmits the radio signals to the radio communication apparatus 300. Also, the transmitter-receiver portion 3 receives a radio signal from the radio communication apparatus 300, converts it into various kinds of information, and transmits the various kinds of information to the processing portion 12. A radio signal that the transmitter-receiver portion 3 communicates with the radio communication apparatus 300 is a radio signal that is in conformity with high-speed radio communication standards such as WiMAX (Worldwide Interoperability for Microwave Access) and the like.

The gyro-sensor is a sensor that detects a vehicle azimuth, and the vehicle speed sensor 5 is a sensor that detects a vehicle speed. The processing portion 12 calculates a vehicle position based on a detection result of a vehicle azimuth and a detection result of a vehicle speed. Thus, even if the GPS receiving portion 1 cannot receive a radio wave, a vehicle position can be calculated.

The storage medium 6 stores various kinds of information such as map information and the like that is transmitted from the server apparatus 200 via the radio communication apparatus 300, and is composed of a hard disc or a semiconductor memory. Besides, the storage medium 6 stores a control program executed by the processing portion 12.

The display 7 displays various kinds of information such as a map, a menu, and the like based on a display signal from the processing portion 12. The speaker 8 releases various voices based on a voice signal from the processing portion 12. The operation portion 9 is used to input various commands, and for example, is disposed on the display 7 as a touch panel.

The camera 10 is used to take an image of a road condition, a sky condition and the like, and a taken image is transmitted to the server apparatus 200. The sensors 11 includes a temperature sensor, a humidity sensor, a vibration sensor, and a fuel amount sensor.

The server apparatus 200 comprises a storage portion 13, a display portion 14, an operation portion 15, and a processing portion 16. The storage portion 13 stores various databases such as a map information database, a route information database and the like. The display portion 14 displays various kinds of information. The operation portion 15 is used by a staff member of the information center B to operate the server apparatus 200.

Each radio communication apparatus 300 is connected to the processing portion 16. The radio communication apparatus 300 receives a radio signal from the transmitter-receiver portion 3 of the navigation apparatus 100, converts the radio signal into various kinds of information, transmits the various kinds of information to the processing portion 16, converts various kinds of information from the processing portion 16 into a radio signal, and transmits the radio signal to the transmitter-receiver portion 3 of the navigation apparatus 100. The processing portion 16 communicates with a terminal 500 via the Internet 400. A road information sensor 600 is disposed on each road, detects a jam condition of a road, and transmits the detection result to the processing portion 16.

Figure 2:
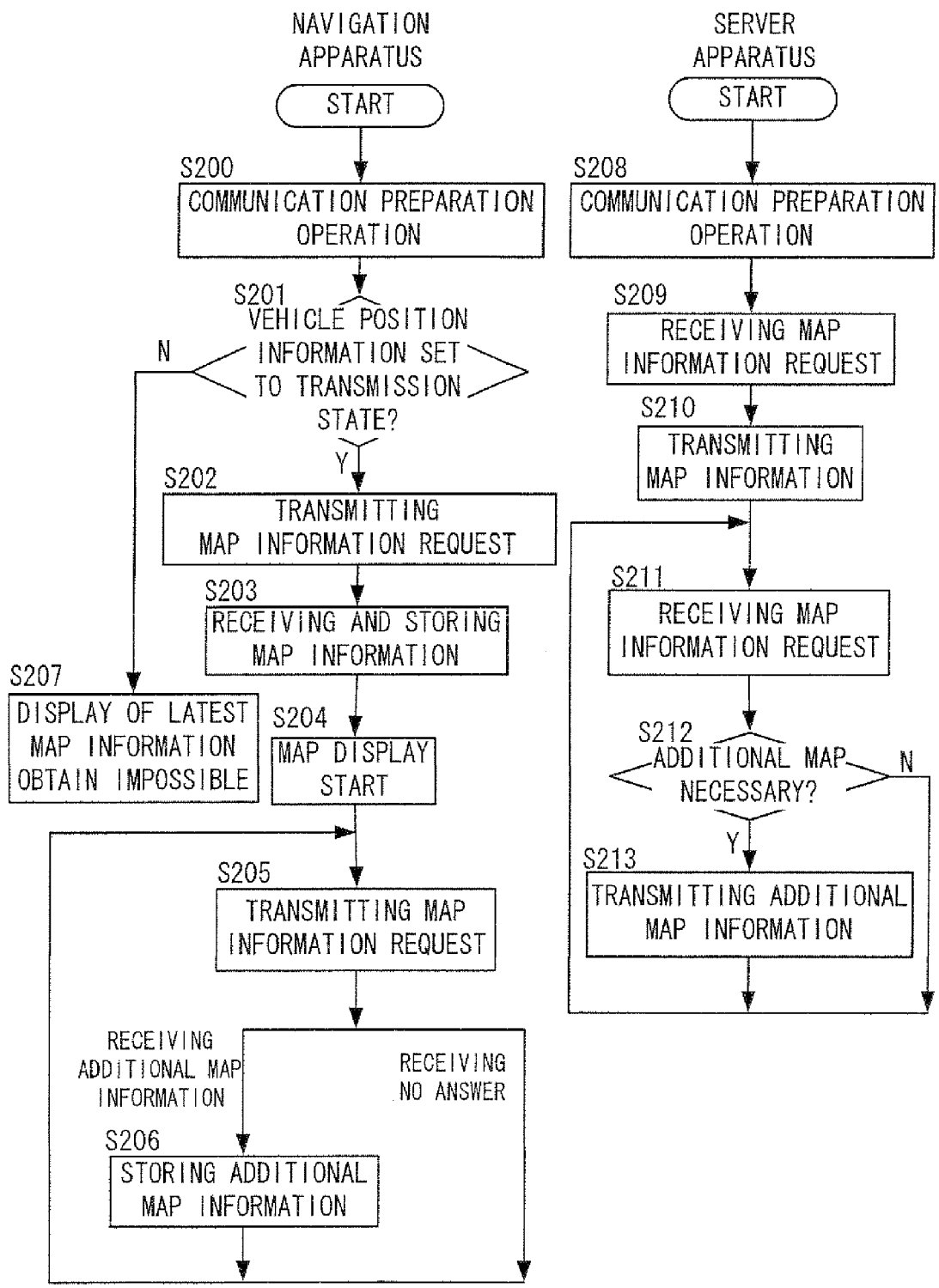
FIG. 2 is a flow chart on an example navigation operation in the present invention.

[Navigation Operation] Next, an example navigation operation of the mobile-body navigation system according to the present invention is explained using the flow chart shown in FIG. 2.

By operating the operation portion 9 with reference to the menu, it is possible to set a transmission/non-transmission flag for each of various kinds of information to or not to transmit said each kind of information to the server apparatus 200, and the processing portion 12 has the transmission/non-transmission flag for each kind of information. The various kinds of information includes a contractor identification ID (an ID that is common to the navigation apparatuses and is used to identify a proper contractor), a contractor specification ID (an ID that is specific to each navigation apparatus), vehicle position information, a taken-with-camera image, vehicle speed information, vibration information, temperature information, humidity information, and fuel amount information.

To begin with, the navigation apparatus 100 and the server apparatus 200 carry out communication preparation operation (the steps S200, S208). Here, the processing portion 12 of the navigation apparatus 100 transmits a communication address request to the processing portion 16 of the server apparatus 200 via the transmitter-receiver portion 3 and via the radio communication apparatus 300. The processing portion 16 transmits an unused communication address to the processing portion 12 via the radio communication apparatus 300 and via the transmitter-receiver portion 3, and the processing portion 12 obtains the communication address. The communication address includes a group address specific to each radio communication apparatus 300 and an identification address to identify each navigation apparatus 100 that is connected to the radio communication apparatus 300. If the transmission/non-transmission flag of a contractor identification ID is set to the transmission state, the processing portion 12 transmits a communication preparation request to the processing portion 16 via the transmitter-receiver portion 3 and via the radio communication apparatus 300. If the processing portion 16 checks the contractor identification ID and determines that the contractor is a proper contractor, the processing portion 16 transmits a communication preparation acknowledgement signal to the processing portion 12 via the radio communication apparatus 300 and via the transmitter-receiver portion 3. Thus, an always-on connection state is prepared between the navigation apparatus 100 and the server apparatus 200. Because the always-on connection state does not occupy a line, it is possible to curb the connection charge to low cost under a monthly-payment contract or the like. If the transmission/non-transmission flag of the contractor identification ID is set to the non-transmission state, the processing portion 12 does not transmits the contractor identification ID to the processing portion 16. Accordingly, the processing portion 16 cannot determine whether or not the contractor is a proper contractor and transmits a refusal answer to the processing portion 12, thereby the connection state is not prepared.

After the connection state is prepared, the processing portion 12 transmits the transmission/non-transmission flag for each kind of information (vehicle position information, taken-with-camera image, vehicle speed information, vibration information, temperature information, humidity information, and fuel amount information) to the processing portion 16 via the transmitter-receiver portion 3 and via the radio communication apparatus 300, and the processing portion 16 obtains the flags. If the transmission/non-transmission flag of the contractor specification ID is set to the transmission state, the processing portion 12 transmits the contractor specification ID to the processing portion 16 via the transmitter-receiver portion 3 and via the radio communication apparatus 300, and the processing portion 16 obtains the contractor specification ID.

Next, in the step S201, the processing portion 12 checks whether or not the transmission/non-transmission flag for the vehicle position information is set to the transmission state, and if it is determined that the transmission/non-transmission flag is set to the transmission state (Y in the step S201), the processing portion 12 goes to the step S202. In the step S202, the processing portion 12 transmits a map information request including the vehicle position information to the radio communication apparatus 300 via the transmitter-receiver portion 3.

In the step S209, the processing portion 16 of the server apparatus 200 receives the map information request via the radio communication apparatus 300, and obtains the vehicle position information. In the step S210, the processing portion 16 extracts map information around the position presented by the obtained vehicle position information from the map information database that is stored in the storage portion 13, and transmits the extracted map information to the transmitter-receiver portion 3 of the navigation apparatus 100 via the radio communication apparatus 300.

In the step S203, the processing portion 12 of the navigation apparatus 100 receives the map information via the transmitter-receiver portion 3 and makes the storage medium 6 store the map information. In the step S204, the processing portion 12 generates a display signal based on a calculated vehicle position and the map information stored in the storage medium 6, and starts to make the display 7 display the map and the vehicle position.

Then, in the step S205, the processing portion 12 transmits a map information request including the vehicle position information to the radio communication apparatus 300 via the transmitter-receiver portion 3. In the step S211, the processing portion 16 of the server apparatus 200 receives the map information request via the radio communication apparatus 300, and obtains the vehicle position information and goes to the step S212. In the step S212, the processing portion 16 determines based on the obtained vehicle position information whether or not it is necessary to add map information. If it is determined that map information does not need to be added (N in the step S212), the processing portion 16 does not transmit an answer to the navigation apparatus 100. Because the navigation apparatus 100 does not receive an answer, the processing portion 12 transmits a map information request again in the step S205.

In the step S212, if it is determined that map information needs to be added (Y in the step S212), the processing portion 16 goes to the step S213. In the step S213, if the map information around the position presented by the obtained vehicle position information includes part that overlaps a region around the position presented by the vehicle position information when the preceding map information was transmitted, the processing portion 16 extracts the part other than the overlapping part from the map information database stored in the storage portion 13, and transmits the extracted map information as the additional map information to the transmitter-receiver portion 3 of the navigation apparatus 100 via the radio communication apparatus 300.

In the step S206, the processing portion 12 of the navigation apparatus 100 receives the additional map information via the transmitter-receiver portion 3 and makes the storage medium 6 store the additional map information. Here, if the map information that is already stored in the storage medium 6 before the additional map information is added includes part which overlaps a region around the position presented by the vehicle position information that is transmitted in the step S205, the processing portion 12 deletes the part other than the overlapping part from the storage medium 6. Thus, the map information stored in the storage medium 6 is updated to the map information of the region around the position presented by the vehicle position information that is transmitted in the step S205. Then, the processing portion 12 generates a display signal based on the updated map information and on a calculated vehicle position, and starts to make the display 7 display the map and the vehicle position. Then, the processing portion 12 returns to the step S205 and transmits again a map information request.

In the step S201, if it is determined that the transmission/non-transmission flag for the vehicle position information is set to the non-transmission state (N in the step S201), the processing portion 12 goes to the step S207 and makes the display 7 display that it is impossible to obtain the latest map information.

According to this navigation operation, it is always possible for the user to take advantage of navigation service using the latest map information. Besides, because only map information that is needed at the moment is stored into the storage medium of the navigation apparatus and is used for navigation, it is possible to reduce dramatically the storage medium capacity. In addition, because only map information that is needed at the moment is stored into the storage medium of the navigation apparatus, the map information can be stored as local data, it is possible to prevent illegal duplication the entire database.

Because the map information around the vehicle position is stored in the storage medium to carry out the map display, it is possible to carry out the map display with no delay, which gives no stress to the user. And it is also possible to continue navigation even if communication trouble occurs.

Figure 3:
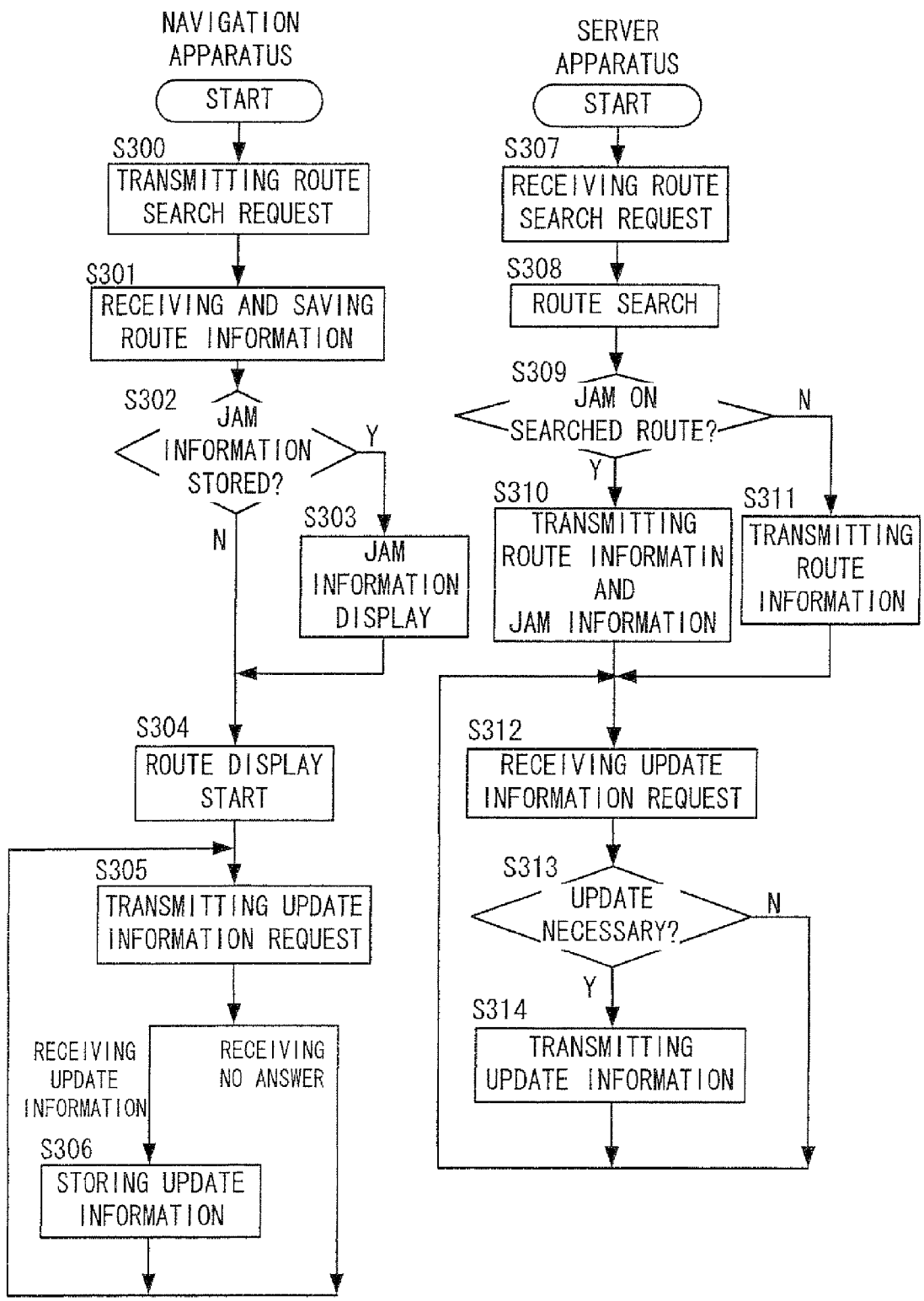
FIG. 3 is a flow chart on another example navigation operation in the present invention.

It also becomes possible that the contractor specification ID and the contractor identification ID are used separately from each other, and the contractor identification ID is transmitted to the server apparatus for confirmation of a proper contractor to take advantage of navigation service, while the contractor specification ID is not transmitted to the server apparatus to avoid specification of the contractor for protection of the contractor's privacy, If a destination is input on the operation portion 9 during the time of map display, an example operation presented by the flow chart shown in FIG. 3 can be started. In the step S300, the processing portion 12 of the navigation apparatus 100 transmits a route search request including the destination information to the radio communication apparatus 300 via the transmitter-receiver portion 3.

In the step S307, the processing portion 16 of the server apparatus 200 receives the route search request via the radio communication apparatus 300. In the step S308, the processing portion 16 carries out a route search based on the destination information, the current obtained vehicle position information, and the route information database stored in the storage portion 13 to obtain a route search result. In the step S309, the processing portion 16 checks based on the route search result and on the jam information database stored in the storage portion 13 whether or not there is a jam on the searched route. If there is a jam (Y in the step S309), the processing portion 16 goes to the step S310, where the jam information database is updated by a detection result from the road information sensor 600 and by jam detection, which is described later, based on a taken image of the road condition from the navigation apparatus 100.

In the step S310, the processing portion 16 transmits the route information on a searched route included in a region presented by the map information around the vehicle position of the latest transmitted map information to the transmitter-receiver portion 3 of the navigation apparatus 100 via the radio communication apparatus 300, together with the confirmed Jam information on the searched route.

In the step S309, if there is not a jam on the searched route (N in the step S309), the processing portion 16 goes to the step S311 and transmits the route information to the transmitter-receiver portion 3 of the navigation apparatus 100 via the radio communication apparatus 300.

In the step S301, the processing portion 12 of the navigation apparatus 100 receives the route information via the transmitter-receiver portion 3, and makes the storage medium 6 store the route information. If the jam information is transmitted in the step S310, the jam information also is stored into the storage medium 6. If the jam information is not stored (N in the step S302), the processing portion 12 goes to the step S304, generates a display signal based on a calculated vehicle position and on the map information and route information stored in the storage medium 6, and starts to make the display 7 display the route besides the map and the vehicle position.

If the jam information is stored into the storage medium 6 (Y in the step S302), the processing portion 12 goes to the step S303, generates a display signal based on the jam information stored in the storage medium 6, and makes the display 7 display the jam information. Then, the processing portion 12 goes to the step S304 and starts to carry out display of the map and route.

Then in step 305, the processing portion 12 of the navigation apparatus 100 transmits an update information request including the vehicle position information to the radio communication apparatus 300 via the transmitter-receiver portion 3. In the step S312, the processing portion 16 of the server apparatus 200 receives the update information request via the radio communication apparatus 300, the processing portion 16 obtains the vehicle position information and goes to the step S313. In the step S313, the processing portion 16 determines whether or not it is necessary to transmit update information (additional map information and additional route information) based on the obtained vehicle position information. If the processing portion 16 determines that it is not necessary to transmit update information (N in the step S313), the processing portion 16 does not transmit an answer to the navigation apparatus 100. Because the navigation apparatus 100 does not receive an answer, the processing portion 12 transmits an update information request again in the step S305.

In the step S313, if it is determined that update information is necessary (Y in the step S313), the processing portion 16 goes to the step S314. In the step S314, if the map information around the position presented by the obtained vehicle position information includes part that overlaps a region around the position presented by the vehicle position information when the preceding map information was transmitted, the processing portion 16 extracts the part other than the overlapping part from the map information database stored in the storage portion 13, and transmits the extracted map information as the additional map information to the transmitter-receiver portion 3 of the navigation apparatus 100 via the radio communication apparatus 300. Also, the route information on the searched route included in the region presented by the additional map information is transmitted as the additional route information.

In the step S306, the processing portion 12 of the navigation apparatus 100 receives the update information via the transmitter-receiver portion 3 and makes the storage medium 6 store the updated information. Here, if the map information that is already stored in the storage medium 6 before the additional map information is added includes part which overlaps a region around the position presented by the vehicle position information that is transmitted in the step S305, the processing portion 16 deletes the part other than the overlapping part from the storage medium 6. Also, the route information on the route included in the deleted part is deleted. Thus, the map information stored in the storage medium 6 is updated to the map information of the region around the position presented by the vehicle position information that is transmitted in the step S305. The route information stored in the storage medium 6 is updated to the route information on the route that is included in the region. Then, the processing portion 12 generates a display signal based on the updated map information, the updated route information and on a calculated vehicle position, and starts to make the display 7 display the map, the route and the vehicle position. Then, the processing portion 12 returns to the step S305 and transmits again an update information request.

As described above, it is always possible for the user to take advantage of navigation service that uses the latest route information. Besides, because the route search is carried out by the server apparatus, a high-end route search processor and an enormous database for route information are not needed in the navigation apparatus, and it is possible to use a low-capability processor and a small-capacity storage medium, which allows cost reduction of the navigation apparatus.

Figure 4:
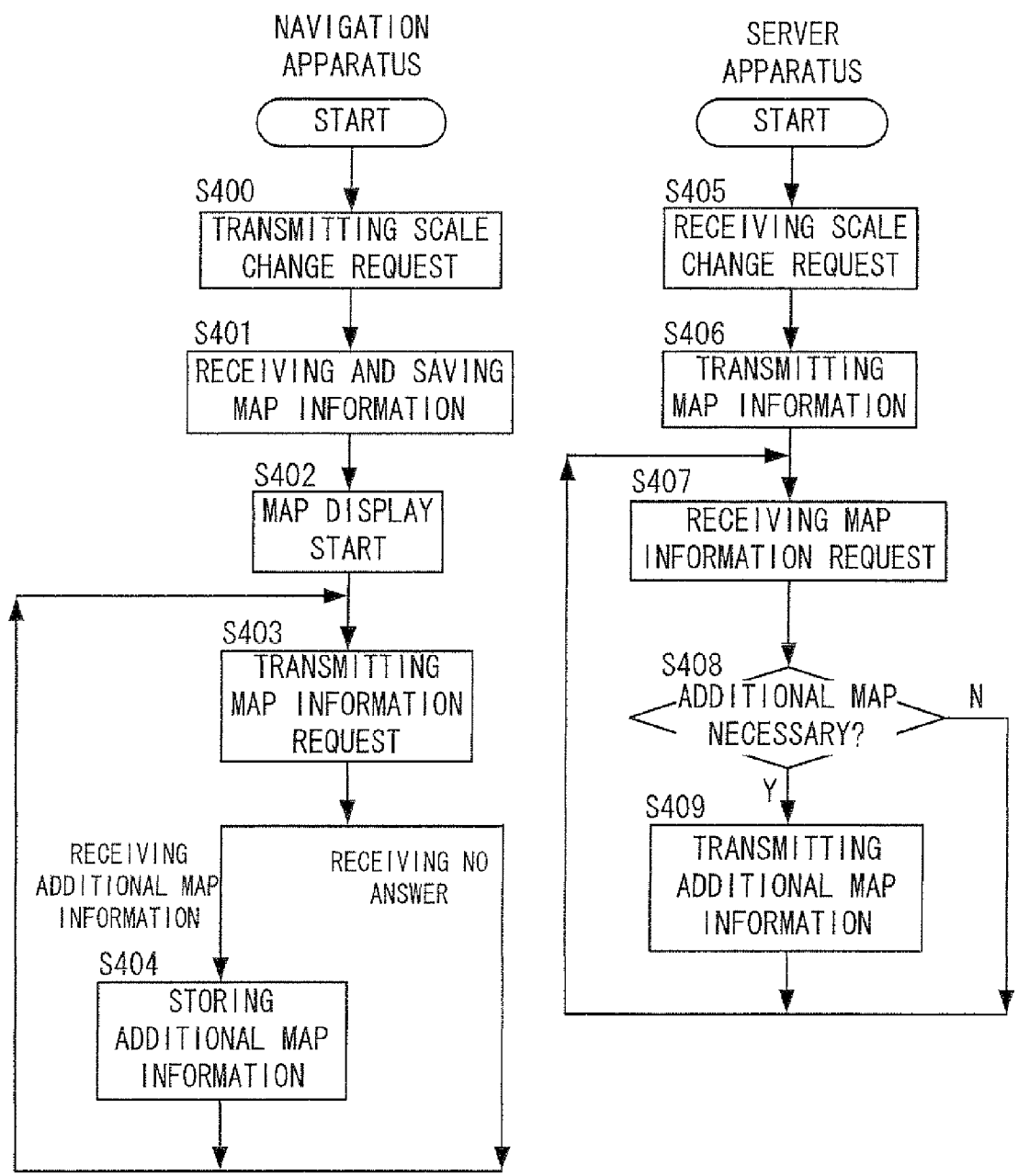
FIG. 4 is a flow chart on an example navigation operation at the time of changing a map scale in the present invention.

If a command for a scale change is input on the operation portion 9 during the time of map display, an example operation presented by the flow chart shown in FIG. 4 can be started. To begin with, in the step S400, the processing portion 12 deletes the map information stored in the storage medium 6 and transmits a scale change request including the vehicle position information to the radio communication apparatus 300 via the transmitter-receiver portion 3. In the step S405, the processing portion 16 of the server apparatus 200 receives the scale change request via the radio communication apparatus 300, and obtains the vehicle position information. In the step S406, the processing portion 16 extracts scale-changed map information around the position presented by the obtained vehicle position information from the map information database that is stored in the storage portion 13, and transmits the extracted map information to the transmitter-receiver portion 3 of the navigation apparatus 100 via the radio communication apparatus 300.

In the step S401, the processing portion 12 of the navigation apparatus 100 receives the map information via the transmitter-receiver portion 3 and makes the storage medium 6 store the map information. In the step S402, the processing portion 12 generates a display signal based on the map information stored in the storage medium 6 and on a calculated vehicle position, and starts to make the display 7 display the map and the vehicle position.

Then, in the step S403, the processing portion 12 transmits a map information request including the vehicle position information to the radio communication apparatus 300 via the transmitter-receiver portion 3. In the step S407, the processing portion 16 of the server apparatus 200 receives the map information request via the radio communication apparatus 300, and obtains the vehicle position information. In the step S408, the processing portion 16 determines based on the obtained vehicle position information whether or not it is necessary to add map information. If the processing portion

16 determines that map information does not need to be added N in the step S408), the processing portion 16 does not transmit an answer to the navigation apparatus 100. Because the navigation apparatus 100 does not receive an answer, the processing portion 12 returns to the step S403 and transmits again a map information request.

If the processing portion 16 determines that map information needs to be added (Y in the step S408), in the step S409, if the map information around the position presented by the obtained vehicle position information includes part that overlaps a region around the position presented by the vehicle position information when the preceding map information was transmitted, the processing portion 16 extracts the part other than the overlapping part from the map information database stored in the storage portion 13, and transmits the extracted map information as the additional map information to the transmitter-receiver portion 3 of the navigation apparatus 100 via the radio communication apparatus 300.

In the step S404, the processing portion 12 of the navigation apparatus 100 receives the additional map information via the transmitter-receiver portion 3 and makes the storage medium 6 store the additional map information. Here, if the map information that is already stored in the storage medium 6 before the additional map information is added includes part which overlaps a region around the position presented by the vehicle position information that is transmitted in the step S403, the processing portion 16 deletes the part other than the overlapping part from the storage medium 6. Thus, the map information stored in the storage medium 6 is updated to the map information of the region around the position presented by the vehicle position information that is transmitted in the step S403. Then, the processing portion 12 generates a display signal based on the updated map information and on a calculated vehicle position, and starts to make the display 7 display the map and the vehicle position. Then, the processing portion 12 returns to the step S403 and transmits again a map information request.

As described above, even if the user wants to change the map scale during the time of map display, the scale-changed map information is transmitted from the server apparatus to the navigation apparatus, and it is possible for the user to take advantage of navigation service that uses the scale-changed map display.

As for change in map scale, in the navigation operation shown in FIG. 2, it may be so structured that after the map information that is going to be displayed at the moment is transmitted in the steps S210 and S213, a different-scale map is extracted from the map information database and transmitted to the navigation apparatus 100. And the different-scale map received by the processing portion 12 of the navigation apparatus 100 is stored into the storage medium 6. Thus, if a scale change operation is carried out on the operation portion 9, the processing portion 12 displays a scale-changed map on the display 7 with no delay, which gives no stress to the user.

An embodiment also is possible, in which a plurality of navigation apparatuses 100 each of which carries out the navigation operation described above and has the contractor specification ID that is registered in the server apparatus 200 in advance transmit vehicle positions to each other, and the transmitted vehicle position is displayed on the navigation apparatuses 100. Thus, in carrying out a drive using a plurality of vehicles and in doing business using a plurality of business vehicles (patrol cars, fire engines or the like), it is possible to confirm in real time the vehicle positions with each other, which is highly convenient.

Figure 5:
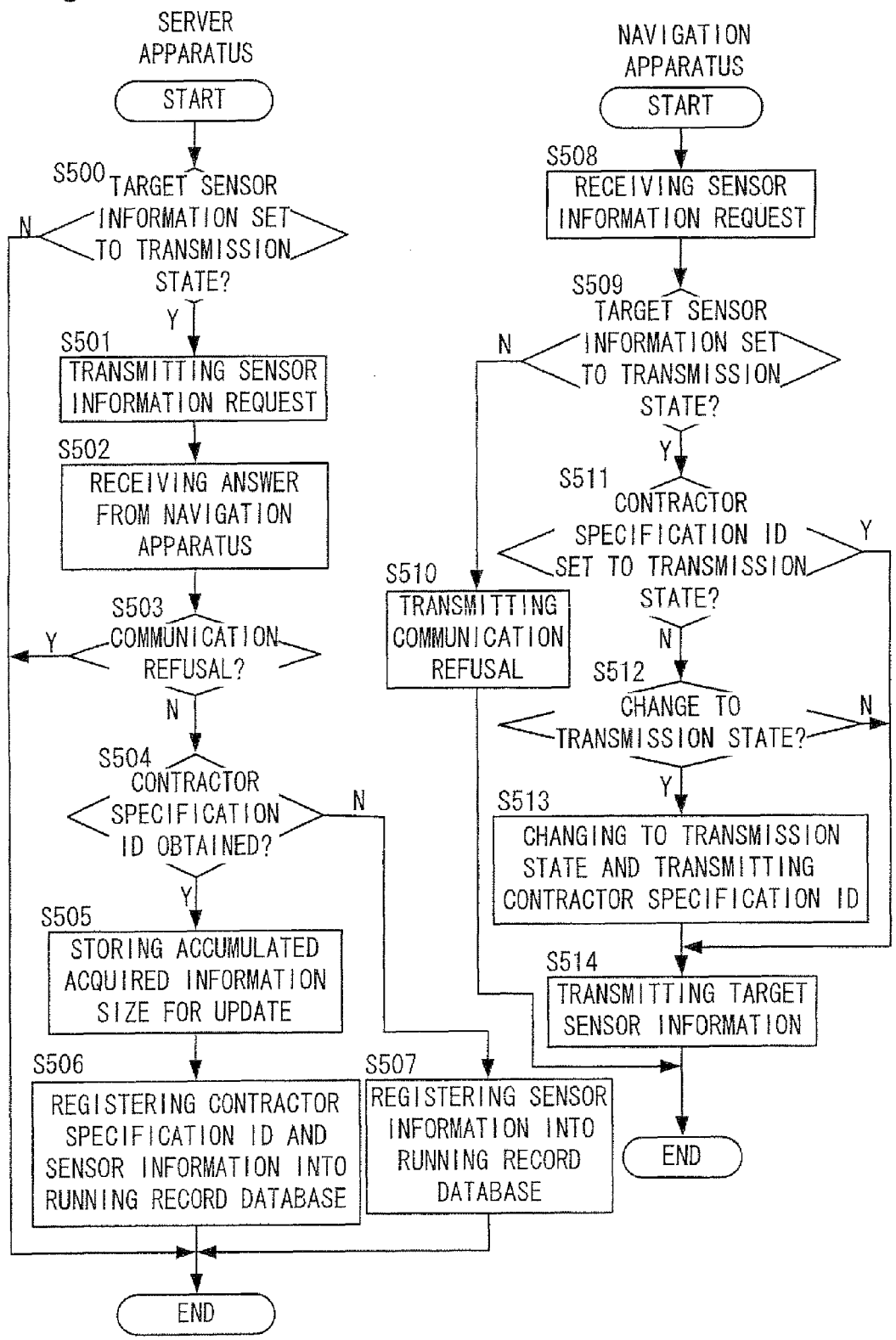
FIG. 5 is a flow chart on an example sensor information acquisition in the present invention.

[Sensor Information Acquisition] Next, an example sensor information acquisition operation of the mobile-body navigation system is explained with reference to the flow chat shown in FIG. 5.

To begin with, in the step S500, the processing portion 16 of the server 200 checks if the transmission/non-transmission flag for sensor information (vehicle speed information, vibration information, temperature information, or humidity information) to be acquired (target sensor information) is set to the transmission state or to the non-transmission state, and if it is determined that the transmission/non-transmission flag is set to the non-transmission state (N in the step S500), the operation is terminated. If the transmission/non-transmission flag is set to the transmission state (Y in the step S500), the processing portion 16 goes to the step S5011

In the step S501, the processing portion 16 transmits a sensor information request to the transmitter-receiver portion 3 via the radio communication apparatus 300. In the step S508, the processing portion 12 of the navigation apparatus 100 receives the sensor information request via the transmitter-receiver portion 3 and goes to the step S509. In the step S509, the processing portion 12 checks if the transmission/non-transmission flag for the target sensor information is set to the transmission state or to the non-transmission state, and if it is determined that the transmission/non-transmission flag is set to the non-transmission state (N in the step S509), the processing portion 12 goes to the step 510 and transmits a communication refusal to the radio communication apparatus 300 via the transmitter-receiver portion 3. If it is determined that the transmission/non-transmission flag is set to the transmission state (Y in the step S509), the processing portion 12 goes to the step 511.

In the step S511, the processing portion 12 checks if the transmission/non-transmission flag for the contractor specification ID is set to the transmission state or to the non-transmission state, and if it is determined that the transmission/non-transmission flag is set to the transmission state (Y in the step S511), the processing portion 12 goes to the step 514. If it is determined that the transmission/non-transmission flag is set to the non-transmission state (N in the step S511), the processing portion 12 goes to the step 512.

In the step S512, the processing portion 12 makes the display 7 display a dialog to ask whether or not to change the setting of the transmission/non-transmission flag for the contractor specification ID to the transmission state, and if the change is selected on the operation portion 9 (Y in the step S512), the processing portion 12 goes to the step S513. In the step S513, the processing portion 12 changes the transmission/non-transmission flag for the contractor specification ID to the transmission state, transmits the contractor specification ID to the radio communication apparatus 300 via the transmitter-receiver portion 3, and further transmits the contractor specification ID to the processing portion 16 of the server apparatus 200. If the non-change is selected (N in the step S512), the processing portion 12 goes to the step S514.

In the step S514, the processing portion 12 transmits the target sensor information to the radio communication apparatus 300 via the transmitter-receiver portion 3.

In the step S502, the processing portion 16 of the server 200 receives an answer from the navigation apparatus 100 via the radio communication apparatus 300, and if the answer is a communication refusal (Y in the S503), the operation is terminated. If the answer is not a communication refusal but is the target sensor information (N in the step S503), the processing portion 16 goes to the step S504.

In the step S504, the processing portion 16 checks if the contractor specification ID is already obtained, and if the contractor specification ID is already obtained (Y in the step S504), the processing portion 16 goes to the step S505. In the step S505, the processing portion 16 stores an accumulated acquired information size (the initial value is 0) that is obtained by adding the information size of the received target sensor information into the storage portion 13 for update relating the accumulated acquired information size to the contractor specification ID. The processing portion 16 calculates a reward for each contractor specification ID based on the accumulated acquired information size, for example, once a month. As for ways of receiving the reward, the contractor receives money, a discount off the usual service charge or the like.

After the step S505, in the step S506, the processing portion 16 registers the target sensor information together with the current time into a running record database stored in the storage portion 13 relating them to the contractor specification ID and to the obtained vehicle position information. If it is determined in the step S504 that the contractor specification ID is not obtained yet (N in the step S504), the processing portion 16 goes to the step 507 and registers the sensor information together with the current time into the running record database relating them to the obtained vehicle position information.

Thus, even at a place where an information acquisition facility is not disposed, it becomes possible to acquire sensor information in real time from each navigation apparatus that is incorporated in each contractor vehicle and to build a running record database, which allows various kinds of information service that uses the database to be provided. Because information acquisition is carried out at a request from the server apparatus, it is possible to prevent traffic concentration and traffic increase due to unnecessary information transmission. Besides, if the transmission/non-transmission flag for a contractor specification ID is set to the transmission state so that the contractor can be specified, a reward for transmitted information size is given, thereby it is possible to encourage positive and cooperative information acquisition from the navigation apparatuses. In addition, because the transmission/non-transmission flag can be set for each piece of sensor information, it becomes possible to provide information following each contractor's policy.

Figure 6:
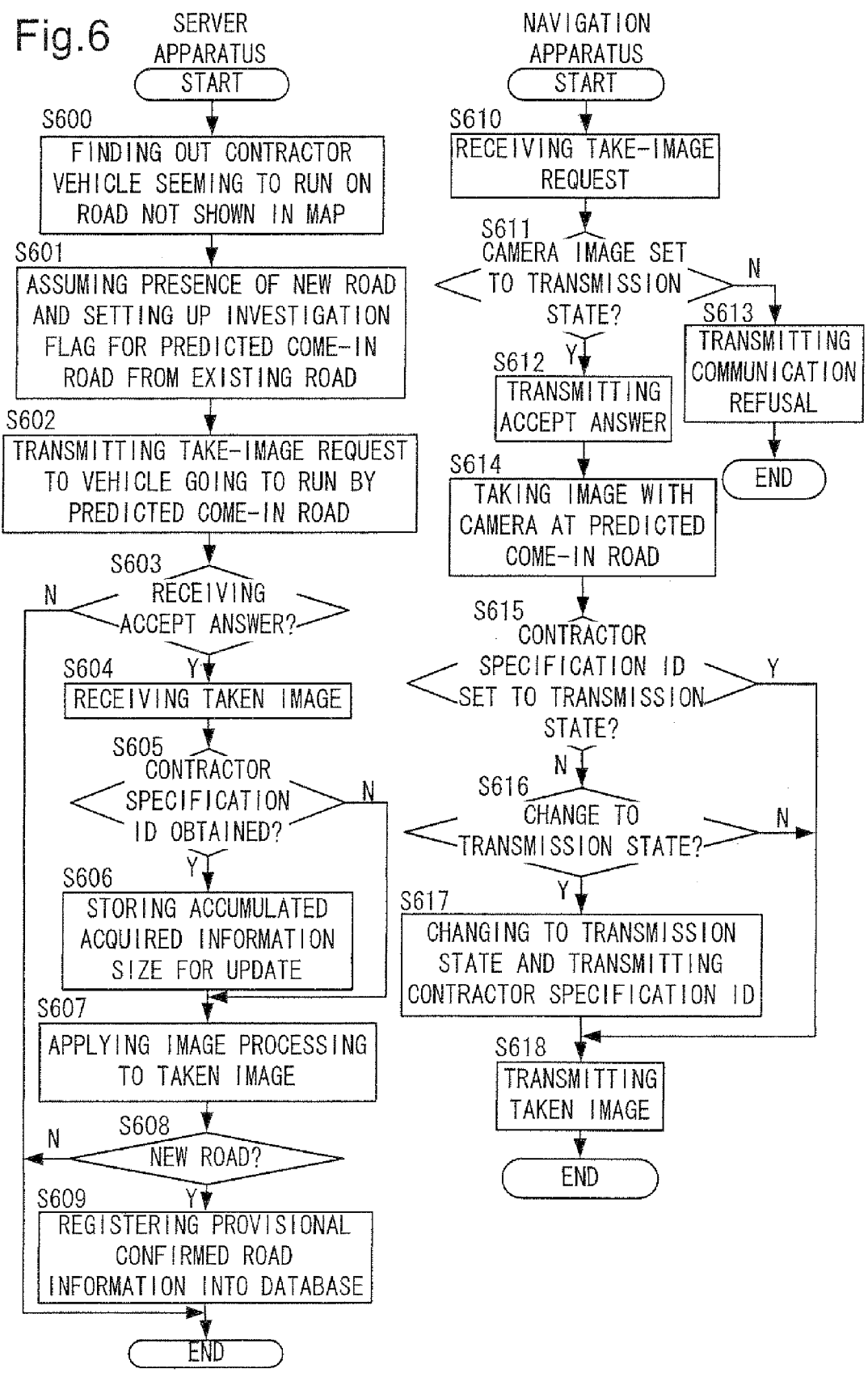
FIG. 6 is a flow chart on an example a new road search in the present invention.

[New Road Search] Next, as an example of the information service that uses the running record database, an example search for a new road that is not present on the map is explained using the flow chart shown in FIG. 6.

To begin with, in the step S600, based on the vehicle position information of the running record database, the processing portion 16 of the server apparatus 200 finds out that a few contractor vehicles seem to be running on a road that is not present on the map of the map information database. In the step S601, the processing portion 16 assumes presence of a new road based on the vehicle position information, and sets up an investigation flag for a place that is predicted to be a come-in road from an existing road in the map.

Then, in the step S602, based on the vehicle position information and on the route search result that are obtained in the navigation operation described above, if the processing portion 16 finds out that there is a contractor vehicle which is going to run by the predicted come-in road where the investigation flag is set up, the processing portion 16 transmits a take-image request including the take-image position information that presents an area nearby the predicted come-in road to the transmitter-receiver portion 3 of the navigation apparatus 100 via the radio communication apparatus 300.

In the step S610, the processing portion 12 of the navigation apparatus 100 receives the take-image request via the transmitter-receiver portion 3, obtains the take-image position information, and goes to the step S611. In the step S611 the processing portion 12 checks if the transmission/non-transmission flag for a taken-with-camera image is set to the transmission state or to the non-transmission state. If it is determined that the transmission/non-transmission flag is set to the non-transmission state (N in the step S611), the processing portion 12 goes to the step S613, and transmits a communication refusal to the radio communication apparatus 300 via the transmitter-receiver portion 3. If it is determined that the transmission non-transmission flag is set to the transmission state (Y in the step S611), the processing portion 12 goes to the step S612, and transmits an accept answer to the radio communication apparatus 300 via the transmitter-receiver portion 3. If the processing portion 16 of the server 200 receives the communication refusal from the radio communication apparatus 300 (N in the step S603), the operation is terminated. If the processing portion 16 receives the accept answer from the radio communication apparatus 300 (Y in the step S603), the processing portion 16 waits to receive a taken image.

After the step S612, in the step S614, based on the detected vehicle position information and on the obtained take-image position information, if the processing portion 12 of the navigation apparatus 100 finds out that the vehicle has reached nearby the predicted come-in road, the processing portion 12 transmits a take-mage signal to the camera 10 to make the camera 10 take an image of a condition of the road, and obtains the taken image from the camera 10.

In the step S615, the processing portion 12 checks if the transmission/non-transmission flag for the contractor specification ID is set to the transmission state or to the non-transmission state. If it is determined that the transmission/non-transmission flag is set to the transmission state (Y in the step S615), the processing portion 12 goes to the step S618. If it is determined that the transmission/non-transmission flag is set to the non-transmission state (N in the step S615), the processing portion 12 goes to the step S616.

In the step S616, the processing portion 12 makes the display 7 display a dialog to ask whether or not to change the setting of the transmission/non-transmission flag for the contractor specification ID to the transmission state, and if the change is selected on the operation portion 9 (Y in the step S616), the processing portion 12 goes to the step S617. In the step S617, the processing portion 12 changes the transmission/non-transmission flag for the contractor specification ID to the transmission state, transmits the contractor specification ID to the radio communication apparatus 300 via the transmitter-receiver portion 3, and further transmits the contractor specification ID to the processing portion 16 of the server apparatus 200. If the non-change is selected (N in the step S616), the processing portion 12 goes to the step S618.

In the step S618, the processing portion 12 transmits the taken image to the radio communication apparatus 300 via the transmitter-receiver portion 3.

In the step S604, the processing portion 16 of the server 200 receives and obtains the taken image via the radio communication apparatus 300. If it is determined that the processing portion 16 has already obtained the contractor specification ID (Y in the step S605), the processing portion 16 goes to the step S606 and stores an accumulated acquired information size that is obtained by adding the information size of the taken image into the storage portion 13 for update relating the accumulated acquired information size to the contractor specification ID.

If it is determined that the contractor specification ID is not obtained yet (N in the step S605), after the step S606, in the step S607, the processing portion 16 applies image processing to the taken image obtained. As a result of the image processing, if the processing portion 16 determines that there is a new road (Y in the step S608), the processing portion 16 goes to the step S609, and registers the road that is assumed to be a new road as a provisional confirmed road into the map information database and into the route information database. Thus, the map information is transmitted from the server apparatus 200 to the navigation apparatus 100 in the navigation operation described above, thereby navigation display including the provisional confirmed road is carried out. Also, a road search including the provisional confirmed road is carried out.

As a result of the image processing, if the processing portion 16 determines that there is not a new road (N in the step S608), the operation is terminated.

As described above, presence of a new road that is not present on the map is assumed based on the running record database, and presence of the new road is confirmed using a taken image, thereby it becomes possible to provide the information on the new road to the contractors as a provisional confirmed road. In FIG. 6, the presence of the new road is confirmed by applying image processing to the taken image. However, an embodiment also is possible, in which the taken image is displayed on the display portion 14 of the server apparatus 200, a staff member of the information center determines by checking the image visually whether or not there is a new road, and the staff member registers the provisional confirmed road information into the database from the operation portion 15.

Figure 7:
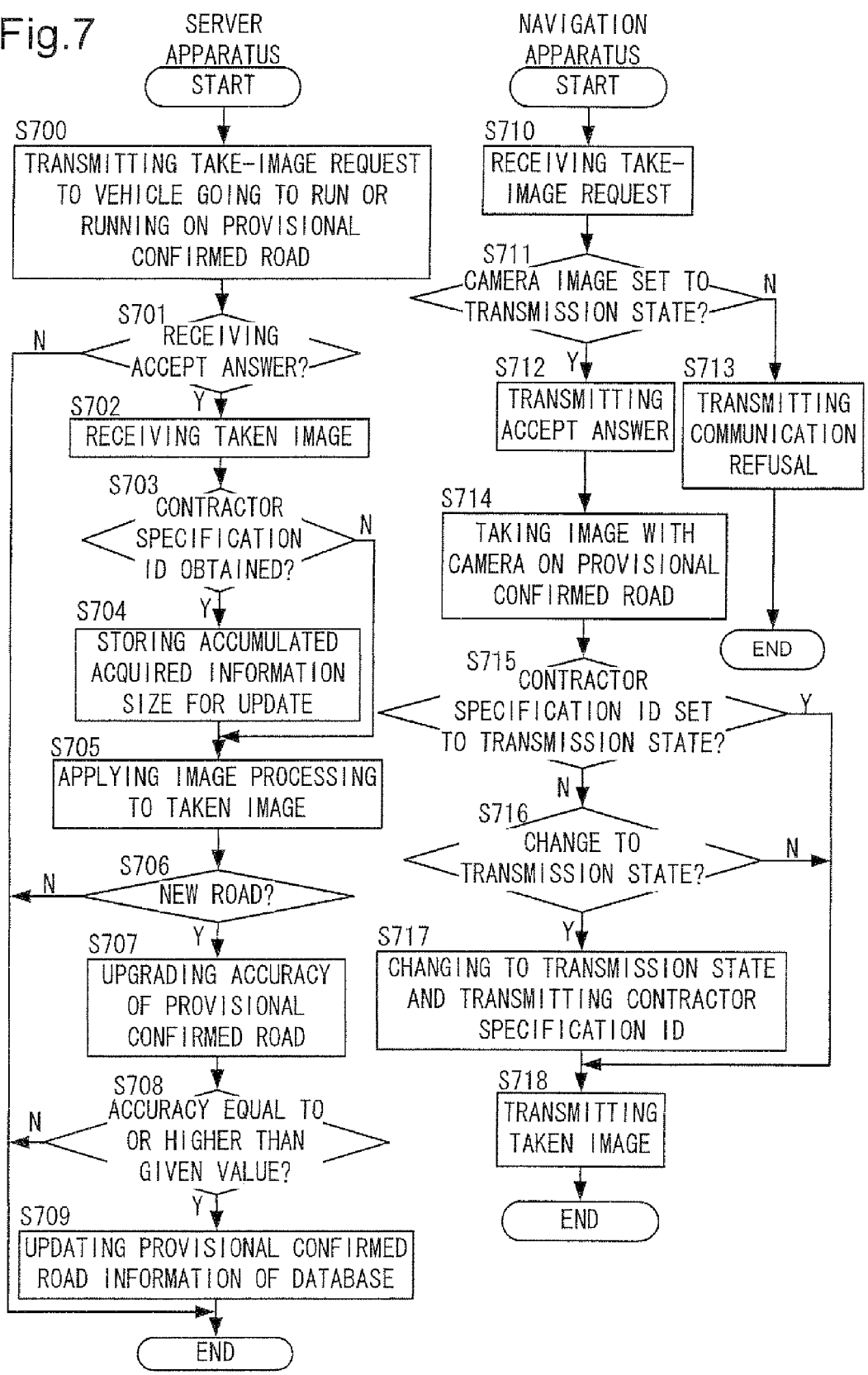
FIG. 7 is a flow chart on an example reconfirmation of a provisionally confirmed road in the present invention.

An example operation of reconfirming this provisional confirmed road and of upgrading accuracy of the new road is explained using the flow chart shown in FIG. 7.

In the step S700, based on the vehicle position information and on the route search result that is obtained in the navigation operation described above, if the processing portion 16 of the server apparatus 200 finds out that there is a contractor vehicle which is going to run on the provisional confirmed road, or based on the vehicle position information that is obtained in the navigation operation described above, if the processing portion 16 finds out that there is a contractor vehicle which is running on the provisional confirmed road, the processing portion 16 transmits a take-image request to the transmitter-receiver portion 3 of the navigation apparatus 100 via the radio communication apparatus 300. Here, if the processing portion 16 finds out that there is a contractor vehicle which is going to run on the provisional confirmed road, the take-image position information that presents the position of the provisional confirmed road is included in the take-image request.

In the step S710, the processing portion 12 of the navigation apparatus 100 receives the take-image request via the transmitter-receiver portion 3, obtains take-image position information if the take-image position information is included in the take-image request, and goes to the step S711. In the step S711, the processing portion 12 checks if the transmission/non-transmission flag for a taken-with-camera image is set to the transmission state or to the non-transmission state. If it is determined that the transmission non-transmission flag is set to the non-transmission state (N in the step S711), the processing portion 12 goes to the step S713, and transmits a communication refusal to the radio communication apparatus 300 via the transmitter-receiver portion 3. If it is determined that the transmission/non-transmission flag is set to the transmission state (Y in the step S711), the processing portion 12 goes to the step S712, and transmits an accept answer to the radio communication apparatus 300 via the transmitter-receiver portion 3. If the processing portion 16 of the server 200 receives the communication refusal from the radio communication apparatus 300 (in the step S701), the operation is terminated. If the processing portion 16 receives the accept answer from the radio communication apparatus 300 (Y in the step S701), the processing portion 16 waits to receive a taken image.

After the step S712, in the step S714, if the processing portion 12 of the navigation apparatus 100 obtains the take-image position information, the processing portion 12 finds out based on a calculated vehicle position and on the obtained take-image position information that the vehicle has arrived at the provisional confirmed road, transmits a take-mage signal to the camera 10 to make the camera 10 take an image of a condition of the road, and obtains the taken image from the camera 10. If the take-image position information is not obtained, the processing portion 12 transmits a take-image signal to the camera 10 with no delay to make the camera 10 take an image, and obtains the taken image from the camera 10.

In the step S715, the processing portion 12 checks if the transmission/non-transmission flag for the contractor specification ID is set to the transmission state or to the non-transmission state. If it is determined that the transmission/non-transmission flag is set to the transmission state (Y in the step S715), the processing portion 12 goes to the step S718. If it is determined that the transmission/non-transmission flag is set to the non-transmission state (N in the step S715), the processing portion 12 goes to the step S716.

In the step S716, the processing portion 12 makes the display 7 display a dialog to ask whether or not to change the setting of the transmission/non-transmission flag for the contractor specification ID to the transmission state, and if the change is selected on the operation portion 9 (Y in the step S716), the processing portion 12 goes to the step S717. In the step S717, the processing portion 12 changes the transmission/non-transmission flag for the contractor specification ID to the transmission state, transmits the contractor specification ID to the radio communication apparatus 300 via the transmitter-receiver portion 3, and further transmits the contractor specification ID to the processing portion 16 of the server apparatus 200. If the non-change is selected (N in the step S716), the processing portion 12 goes to the step S718.

In the step S718, the processing portion 12 transmits the taken image to the radio communication apparatus 300 via the transmitter-receiver portion 3.

In the step S702, the processing portion 16 of the server 200 receives and obtains the taken image via the radio communication apparatus 300. If it is determined that the processing portion 16 has already obtained the contractor specification ID (Y in the step S703), the processing portion 16 goes to the step S704 and stores an accumulated acquired information size that is obtained by adding the information size of the taken image into the storage portion 13 for update relating the accumulated acquired information size to the contractor specification ID.

If it is determined that the contractor specification ID is not obtained yet (N in the step S703), after the step S704, in the step S705, the processing portion 16 applies image processing to the taken image obtained. As a result of the image processing, if the processing portion 16 determines that there is a new road (Y in the step S706), the processing portion 16 goes to the step S707, and upgrades accuracy of the provisional confirmed road (the initial value of accuracy is 0). If the processing portion 16 determines that there is not a new road (N in the step S706), the operation is terminated.

After the step S707, if the processing portion 16 determines that the accuracy is lower than a given value (N in the step S708) the operation is terminated. The operation presented by the flow chart shown in FIG. 7 is repeated, and the accuracy is upgraded in the step S707. In the step S708, if the processing portion 16 determines that the accuracy is equal to or higher than the given value (Y in the step S708), the processing portion 16 goes to the step S709, and updates the provisional confirmed road information of the map information database to display that the accuracy of the provisional confirmed road is upgraded. Thus, the map information is transmitted to the navigation apparatus 100 from the server apparatus 200 in the navigation operation described above, thereby the navigation display including the provisional confirmed road display is carried out to show that the accuracy is upgraded.

Figure 8:
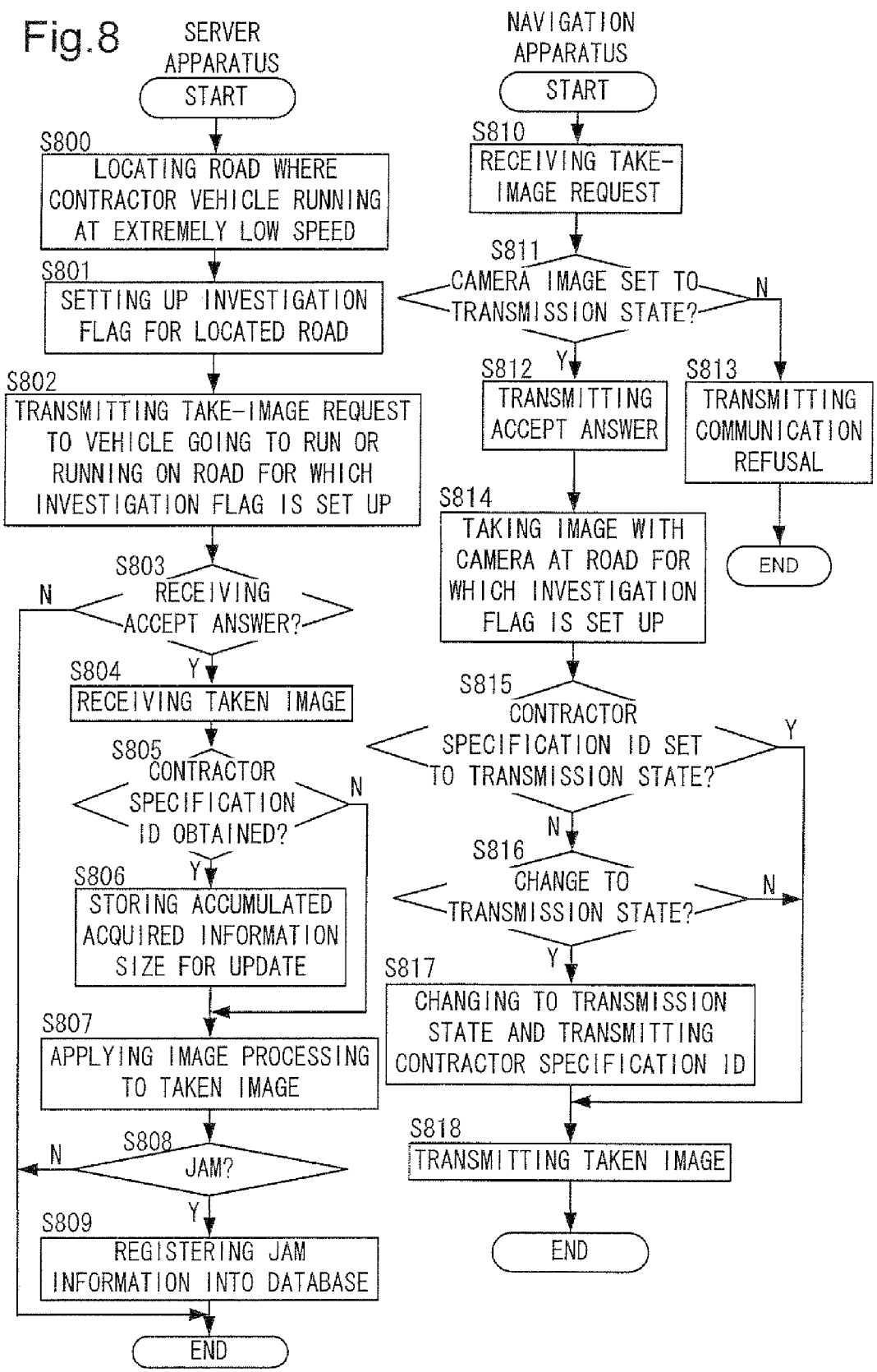
FIG. 8 is a flow chart on an example jam detection in the present invention.

[Jam Detection] Next, as an example of the information service that uses the running record database, an example jam detection is explained using the flow chart shown in FIG. 8.

To begin with, in the step S800, the processing portion 16 of the server apparatus 200 locates based on the running record database a road where a few contractor vehicles are running at an extremely low speed. Here, the road may be located based on the vehicle position information and on the vehicle speed information of the running record database, or may be located based on the vehicle position information and on the time information of the running record database. In the step S801, the processing portion 16 assumes a jam and sets up an investigation flag for the located road.

In the step S802, based on the vehicle position information and on the route search result that are obtained in the navigation operation described above, if the processing portion 16 of the server apparatus 200 finds out that there is a contractor vehicle which is going to run on the road for which the investigation flag is set up, or based on the vehicle position information that is obtained in the navigation operation described above, if the processing portion 16 finds out that there is a contractor vehicle which is running on the road for which the investigation flag is set up, the processing portion 16 transmits a take-image request to the transmitter-receiver portion 3 of the navigation apparatus 100 via the radio communication apparatus 300. Here, if the processing portion 16 finds out that there is a contractor vehicle which is going to run on the road for which the investigation flag is set up, the take-image position information that presents the position of the road for which the investigation flag is set up is included in the take-image request.

In the step S810, the processing portion 12 of the navigation apparatus 100 receives the take-image request via the transmitter-receiver portion 3, obtains take-image position information if the take-image position information is included in the take-image request, and goes to the step S811. In the step S811, the processing portion 12 checks if the transmission/non-transmission flag for a taken-with-camera image is set to the transmission state or to the non-transmission state. If it is determined that the transmission/non-transmission flag is set to the non-transmission state (N in the step S811), the processing portion 12 goes to the step S813, and transmits a communication refusal to the radio communication apparatus 300 via the transmitter-receiver portion 3. If it is determined that the transmission/non-transmission flag is set to the transmission state (Y in the step S811), the processing portion 12 goes to the step S812, and transmits an accept answer to the radio communication apparatus 300 via the transmitter-receiver portion 3. If the processing portion 16 of the server 200 receives the communication refusal from the radio communication apparatus 300 (N in the step S803), the operation is terminated. If the processing portion 16 receives the accept answer from the radio communication apparatus 300 (Y in the step S803), the processing portion 16 waits to receive a taken image.

After the step S812, in the step S814, if the processing portion 12 of the navigation apparatus 100 obtains the take-image position information, the processing portion 12 finds out based on a calculated vehicle position and on the obtained take-image position information that the vehicle has arrived at the road for which the investigation flag is set up, transmits a take-mage signal to the camera 10 to make the camera 10 take an image of a condition of the road, and obtains the taken image from the camera 10. If the take-image position information is not obtained, the processing portion 12 transmits a take-image signal to the camera 10 with no delay to make the camera 10 take an image, and obtains the taken image from the camera 10.

In the step S815, the processing portion 12 checks if the transmission/non-transmission flag for the contractor specification ID is set to the transmission state or to the non-transmission state. If it is determined that the transmission/non-transmission flag is set to the transmission state (Y in the step S815), the processing portion 12 goes to the step S818. If it is determined that the transmission/non-transmission flag is set to the non-transmission state (N in the step S815), the processing portion 12 goes to the step S816.

In the step S816, the processing portion 12 makes the display 7 display a dialog to ask whether or not to change the setting of the transmission/non-transmission flag for the contractor specification ID to the transmission state, and if the change is selected on the operation portion 9 (Y in the step S816), the processing portion 12 goes to the step S817. In the step S817, the processing portion 12 changes the transmission/non-transmission flag for the contractor specification ID to the transmission state, transmits the contractor specification ID to the radio communication apparatus 300 via the transmitter-receiver portion 3, and further transmits the contractor specification ID to the processing portion 16 of the server apparatus 200. If the non-change is selected (N in the step S816), the processing portion 12 goes to the step S818.

In the step S818, the processing portion 12 transmits the taken image to the radio communication apparatus 300 via the transmitter-receiver portion 3.

In the step S804, the processing portion 16 of the server 200 receives and obtains the taken image via the radio communication apparatus 300. If it is determined that the processing portion 16 has already obtained the contractor specification ID (Y in the step S805), the processing portion 16 goes to the step S806 and stores an accumulated acquired information size that is obtained by adding the information size of the taken image into the storage portion 13 for update relating the accumulated acquired information size to the contractor specification ID.

If it is determined that the contractor specification ID is not obtained yet (N in the step S805), after the step S806, in the step S807, the processing portion 16 applies image processing to the taken image obtained. As a result of the image processing, if the processing portion 16 determines that there is a jam (Y in the step S808), the processing portion 16 goes to the step S809, and registers jam information that presents the jam on the road for which the investigation flag is set up into the jam information database. Thus, in the navigation operation described above, if there is a jam registered here on a searched road, the jam information on the jam is displayed on the navigation apparatus 100.

As a result of the image processing, if the processing portion 16 determines that there is not a jam (N in the step S808), the operation is terminated.

As described above, presence of a jam is assumed based on the running record database, and presence of the jam is confirmed using a taken image, thereby it becomes possible to provide the confirmed jam information to the contractors. In FIG. 8, the presence of the jam is confirmed by applying image processing to the taken image. However, an embodiment also is possible, in which the taken image is displayed on the display portion 14 of the server apparatus 200, a staff member of the information center determines by checking the image visually whether or not there is a jam, and the staff member registers the jam information into the database from the operation portion 15.

Figure 9:
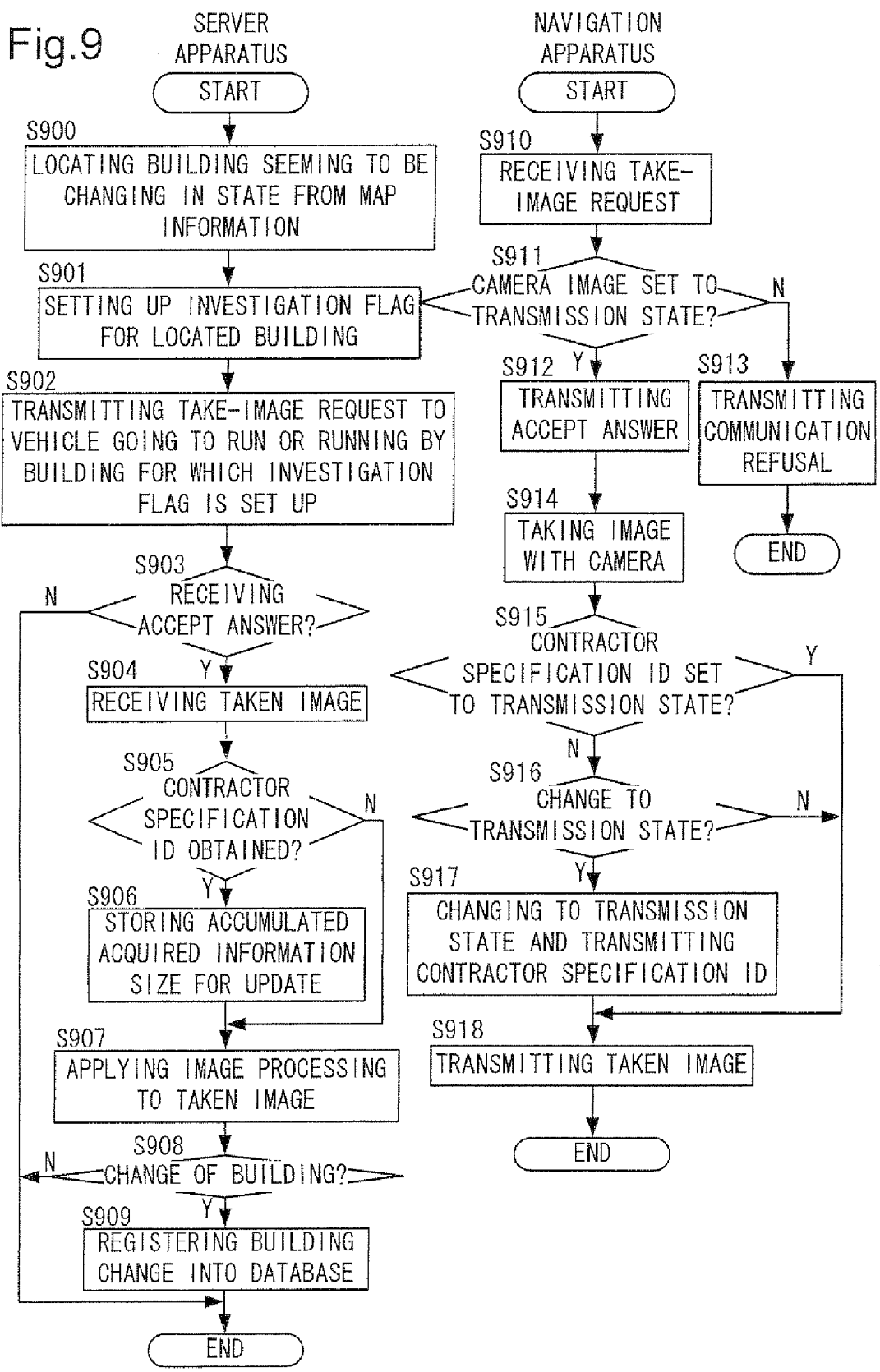
FIG. 9 is a flow chart on an exam.le detection of building condition change in the present invention.

[Locating New/Removed Building] Next, an example operation of locating a building whose state is changing from the state shown in the map is explained using the flow chart shown in FIG. 9.

To begin with, in the step S900, by matching the current image and the map information of the map information database with each other by use of image recognition, the processing portion 16 of the server apparatus 200 locates a new building that is not present in the map information but seems to be under construction, or a building that is present in the map information but seems to be removed. In the step S901, the processing portion 16 sets up an investigation flag for the located building.

In the step S902, based on the vehicle position information and on the route search result that are obtained in the navigation operation described above, if the processing portion 16 of the server apparatus 200 finds out that there is a contractor vehicle which is going to run by the building for which the investigation flag is set up, or based on the vehicle position information that is obtained in the navigation operation described above, if the processing portion 16 finds out that there is a contractor vehicle which is running by the building for which the investigation flag is set up, the processing portion 16 transmits a take-image request to the transmitter-receiver portion 3 of the navigation apparatus 100 via the radio communication apparatus 300. Here, if the processing portion 16 finds out that there is a contractor vehicle which is going to run by the building for which the investigation flag is set up, the take-image position information that presents the position by the building for which the investigation flag is set up is included in the take-image request.

In the step S910, the processing portion 12 of the navigation apparatus 100 receives the take-image request via the transmitter-receiver portion 3, obtains take-image position information if the take-image position information is included in the take-image request, and goes to the step S911. In the step S911, the processing portion 12 checks if the transmission/non-transmission flag for a taken-with-camera image is set to the transmission state or to the non-transmission state. If it is determined that the transmission/non-transmission flag is set to the non-transmission state (N in the step S911), the processing portion 12 goes to the step S913, and transmits a communication refusal to the radio communication apparatus 300 via the transmitter-receiver portion 3. If it is determined that the transmission/non-transmission flag is set to the transmission state (Y in the step S911), the processing portion 12 goes to the step S912, and transmits an accept answer to the radio communication apparatus 300 via the transmitter-receiver portion 3. If the processing portion 16 of the server 200 receives the communication refusal from the radio communication apparatus 300 (N in the step S903), the operation is terminated. If the processing portion 16 receives the accept answer from the radio communication apparatus 300 (Y in the step S903), the processing portion 16 waits to receive a taken image.

After the step S912, in the step S914, if the processing portion 12 of the navigation apparatus 100 obtains the take-image position information, the processing portion 12 finds out based on a calculated vehicle position and on the obtained take-image position information that the vehicle has arrived at the building for which the investigation flag is set up, transmits a take-mage signal to the camera 10 to make the camera 10 take an image of a state of the building, and obtains the taken image from the camera 10. If the take-image position information is not obtained yet, the processing portion 12 transmits a take-image signal to the camera 10 with no delay to make the camera 10 take an image, and obtains the taken image from the camera 10.

In the step S915, the processing portion 12 checks if the transmission/non-transmission flag for the contractor specification ID is set to the transmission state or to the non-transmission state. If it is determined that the transmission/non-transmission flag is set to the transmission state (Y in the step S915), the processing portion 12 goes to the step S918. If it is determined that the transmission/non-transmission flag is set to the non-transmission state (N in the step S915), the processing portion 12 goes to the step S916.

In the step S916, the processing portion 12 makes the display 7 display a dialog to ask whether or not to change the setting of the transmission/non-transmission flag for the contractor specification ID to the transmission state, and if the change is selected on the operation portion 9 (Y in the step S916), the processing portion 12 goes to the step S917. In the step S917, the processing portion 12 changes the transmission/non-transmission flag for the contractor specification ID to the transmission state, transmits the contractor specification ID to the radio communication apparatus 300 via the transmitter-receiver portion 3, and further transmits the contractor specification ID to the processing portion 16 of the server apparatus 200. If the non-change is selected (N in the step S916), the processing portion 12 goes to the step S918.

In the step S918, the processing portion 12 transmits the taken image to the radio communication apparatus 300 via the transmitter-receiver portion 3.

In the step S904, the processing portion 16 of the server 200 receives and obtains the taken image via the radio communication apparatus 300. If it is determined that the processing pot on portion 16 has already obtained the contractor specification ID (Y in the step S905), the processing portion 16 goes to the step S906 and stores an accumulated acquired information size that is obtained by adding the information size of the taken image into the storage portion 13 for update relating the accumulated acquired information size to the contractor specification ID.

If it is determined that the contractor specification ID is not obtained yet (N in the step S905), after the step S906, in the step S907, the processing portion 16 applies image processing to the taken image obtained. As a result of the image processing, if the processing portion 16 determines that there is a state change of the building (Y in the step S908), the processing portion 16 goes to the step S909, and registers the state change of the building as provisional confirmed information into the map information database. Thus, in the navigation operation described above, the map information is transmitted to the navigation apparatus 100 from the server apparatus 200, thereby the navigation display including the state change of the building is carried out.

As a result of the image processing, if the processing portion 16 determines that there is not a change in the building (N in the step S908), the operation is terminated.

As described above, it is assumed that a building is changing from the current state shown in the map, and a state change is confirmed using a taken image, thereby it becomes possible to provide the information on the state change of the building to the contractor. In FIG. 9, the state change of the building is confirmed by applying image processing to the taken image. However, an embodiment also is possible in which the taken image is displayed on the display portion 14 of the server apparatus 200, a staff member of the information center determines by checking the image visually whether or not there is a state change, and the staff member registers the provisional confirmed information into the database from the operation portion 15.

Figure 10:
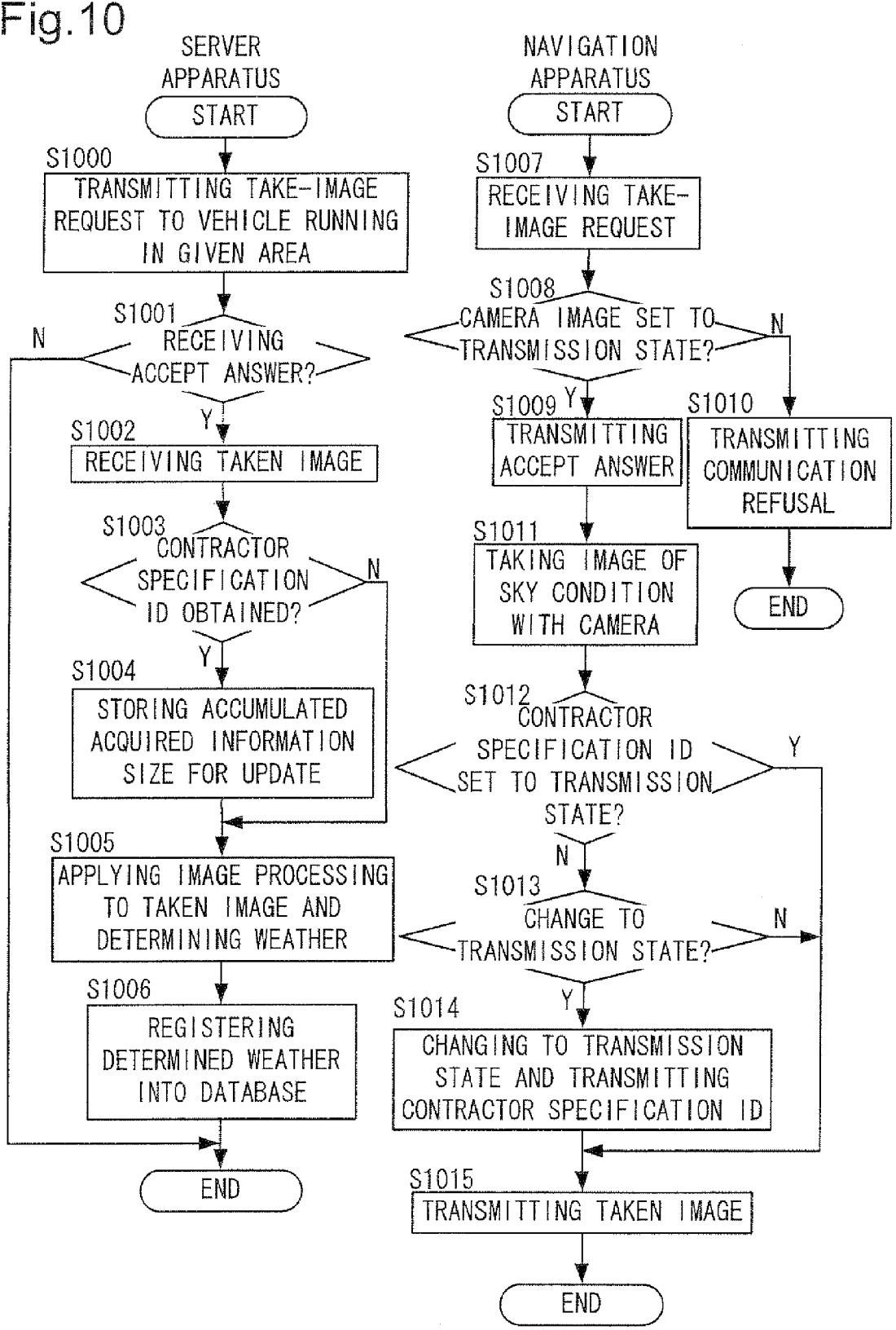
FIG. 10 is a flow chart on an example weather information acquisition in the present invention.

[Weather Information Acquisition] Next, an example weather information acquisition using an image taken by the navigation apparatus is explained using the flow chart shown in FIG. 10.

To begin with, in the step S1000, if the processing portion 16 of the server apparatus 200 finds out based on the vehicle position information that is obtained in the navigation operation described above that there is a contractor vehicle which is running in a given area, the processing portion 16 transmits a take-image request to the transmitter-receiver portion 3 of the navigation apparatus 100 via the radio communication apparatus 300.

In the step S1007, the processing portion 12 of the navigation apparatus 100 receives the take-image request via the transmitter-receiver portion 3, and goes to the step S1008. In the step S1008, the processing portion 12 checks if the transmission/non-transmission flag for a taken-with-camera image is set to the transmission state or to the non-transmission state. If it is determined that the transmission/non-transmission flag is set to the non-transmission state (N in the step S1008), the processing portion 12 goes to the step S1010, and transmits a communication refusal to the radio communication apparatus 300 via the transmitter-receiver portion 3. If it is determined that the transmission/non-transmission flag is set to the transmission state (Y in the step S1008), the processing portion 12 goes to the step S1009, and transmits an accept answer to the radio communication apparatus 300 via the transmitter-receiver portion 3. If the processing portion 16 of the server 200 receives the communication refusal from the radio communication apparatus 300 (N in the step S1001), the operation is terminated. If the processing portion 16 receives the accept answer from the radio communication apparatus 300 (Y in the step S1001), the processing portion 16 waits to receive a taken image.

After the step S1009, in the step S1011, the processing portion 12 of the navigation apparatus 100 transmits a take-mage signal to the camera 10 to make the camera 10 take an image of a condition of the sky, and obtains the taken image from the camera 10.

In the step S1012, the processing portion 12 checks if the transmission/non-transmission flag for the contractor specification ID is set to the transmission state or to the non-transmission state. If it is determined that the transmission/non-transmission flag is set to the transmission state (Y in the step S1012), the processing portion 12 goes to the step S1015. If it is determined that the transmission/non-transmission flag is set to the non-transmission state (N in the step S1012), the processing portion 12 goes to the step S1013.

In the step S1013, the processing portion 12 makes the display 7 display a dialog to ask whether or not to change the setting of the transmission/non-transmission flag for the contractor specification ID to the transmission state, and if the change is selected on the operation portion 9 (Y in the step S1013), the processing portion 12 goes to the step S1014. In the step S1014, the processing portion 12 changes the transmission/non-transmission flag for the contractor specification ID to the transmission state, transmits the contractor specification ID to the radio communication apparatus 300 via the transmitter-receiver portion 3, and further transmits the contractor specification ID to the processing portion 16 of the server apparatus 200. If the non-change is selected (N in the step S1013), the processing portion 12 goes to the step S1015.

In the step S1015, the processing portion 12 transmits the taken image to the radio communication apparatus 300 via the transmitter-receiver portion 3.

In the step S1002, the processing portion 16 of the server 200 receives and obtains the taken image via the radio communication apparatus 300. If it is determined that the processing portion 16 has already obtained the contractor specification ID (Y in the step S1003), the processing portion 16 goes to the step S1004 and stores an accumulated acquired information size that is obtained by adding the information size of the taken image into the storage portion 13 for update relating the accumulated acquired information size to the contractor specification ID.

If it is determined that the contractor specification ID is not obtained yet (N in the step S1003), after the step S1004, in the step S1005, the processing portion 16 applies image processing to the taken image obtained to determine weather. Here, a weather database that presents weather of each area is stored in the storage portion 13. After the step S1005, in the step S1006, the processing portion 16 registers weather that is determined to be the weather of the given area into the weather database.

As described above, the navigation apparatus takes an image of a sky condition at a request from the server apparatus, and weather information based on the taken image is acquired into the server apparatus. In FIG. 10, image processing is applied to the taken image to determine weather, and the determined weather is registered into the weather database. However, the taken image itself may be registered into the weather database.

Figure 11:
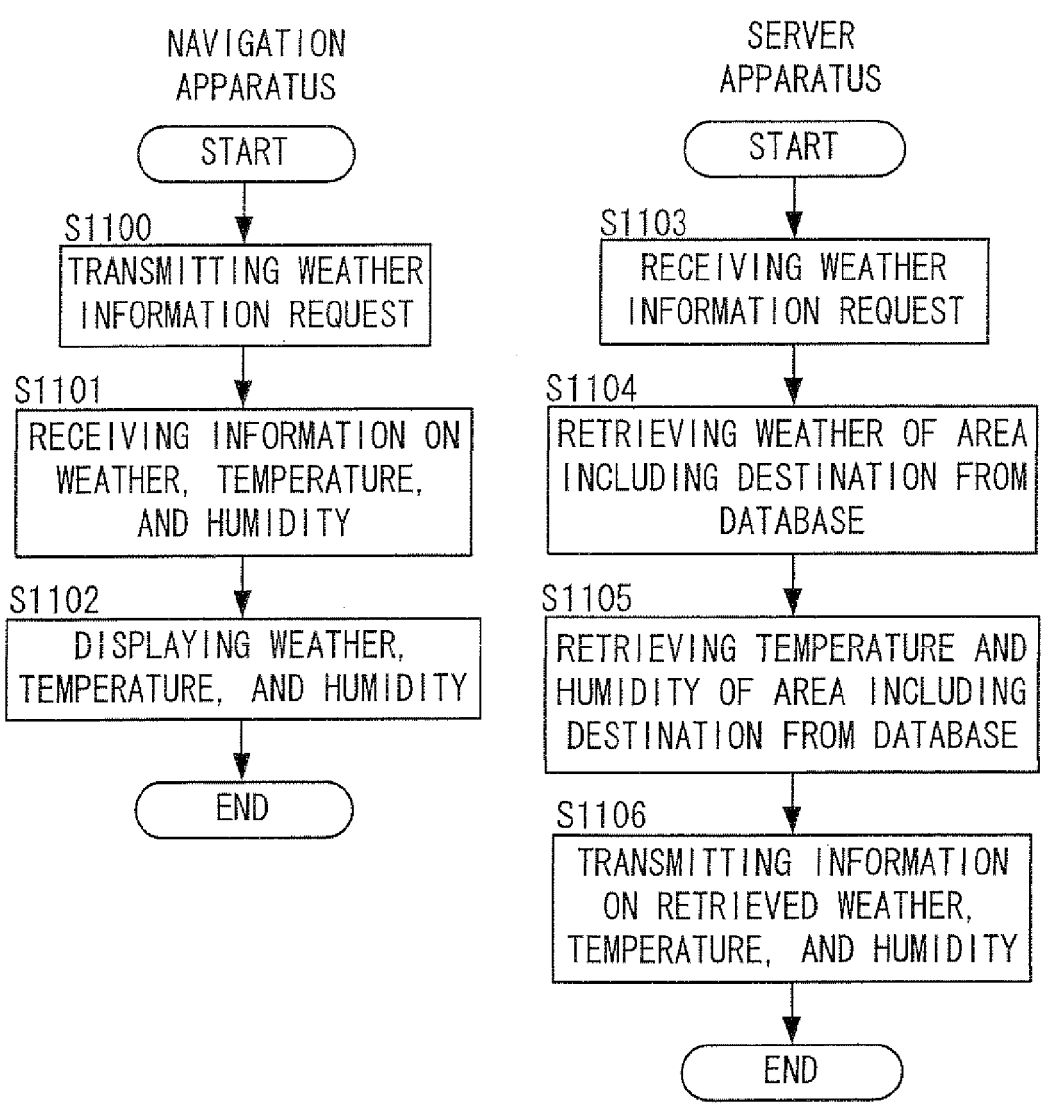
FIG. 11 is a flow chart on an example delivery of meteorological information in the present invention.

[Meteorological-Information Delivery To Contractor] Next, an example delivery of meteorological information to a contractor is explained using the flow chart shown in FIG. 11.

If weather information acquisition operation is carried out on the operation portion 9 of the navigation apparatus 100 during the navigation operation described above, in the step S1100, the processing portion 12 transmits a weather information request to the radio communication apparatus 300 via the transmitter-receiver portion 3. In the step S1103, if the processing portion 16 of the server apparatus 200 receives the weather information request via the radio communication apparatus 300, the processing portion 16 goes to the step S1104.

In the step S1104, the processing portion 16 retrieves from the weather database the weather of an area that includes the destination presented by the destination information which is obtained in the navigation operation described above. In the step S1105, the processing portion 16 retrieves the temperature and humidity of the area that includes the destination from the running record database. In the step S1106, the processing portion 16 transmits each kind of information on the retrieved weather, temperature, and humidity to the transmitter-receiver portion 3 of the navigation apparatus 100 via the radio communication apparatus 300.

In the step S1101, the processing portion 12 of the navigation apparatus 100 receives said each kind of information on the weather, temperature, and humidity via the transmitter-receiver portion 3. Then in the step S1102, the processing portion 12 generates a display signal based on said received each kind of information, and makes the display 7 display the weather, temperature, and humidity. Thus, the contractor can understand the meteorological information of the destination, that is, the weather, temperature, and humidity.

As described above, when registering a taken image into the weather database in acquisition of meteorological information, an embodiment also is possible in which in the step S1104, the taken image of the area that includes the destination is retrieved from the weather database, and the retrieved taken image is transmitted to the navigation apparatus 100 and is displayed. Instead of displaying the meteorological information, it may be released from the speaker 8 by voice.

Figure 12:
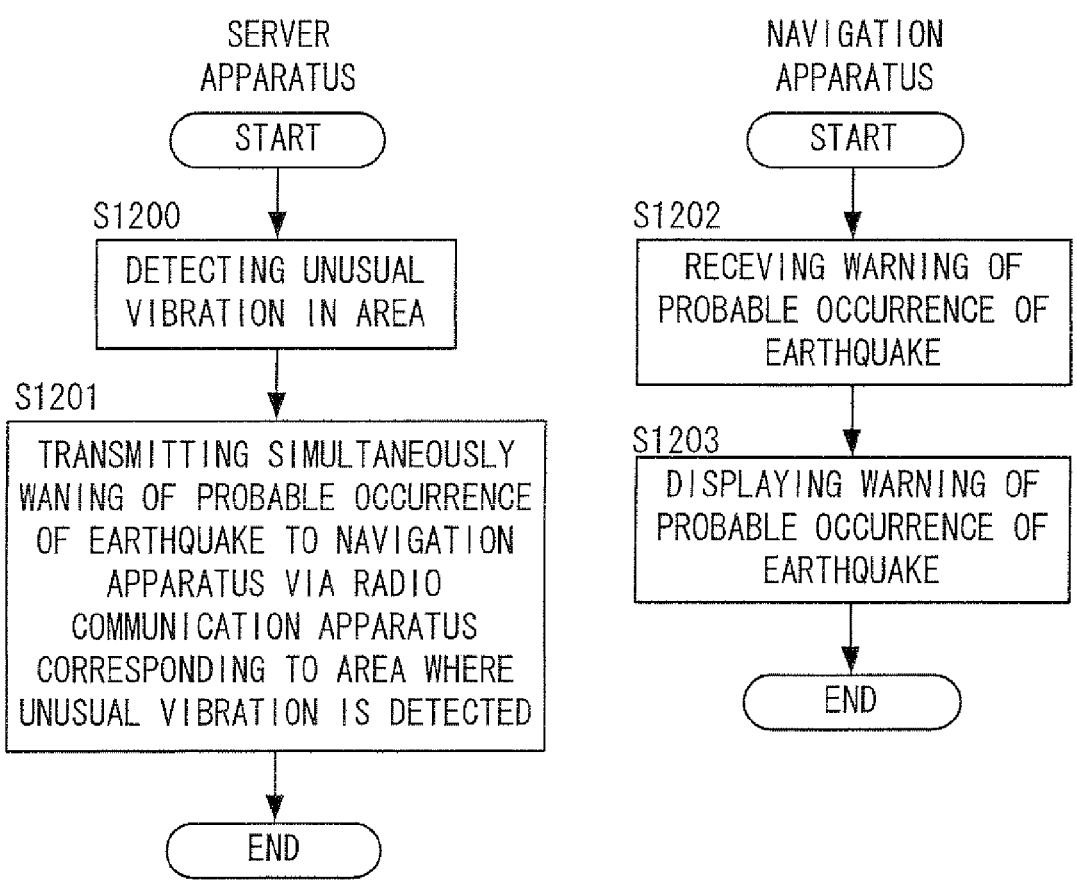
FIG. 12 is a flow chart on an example simultaneous notice of earthquake warning in the present invention.

[Simultaneous Notice Of Earthquake Warning] Next, as an example of emergency notice, simultaneous notice of earthquake warning is explained using the flow chart shown in FIG. 12.

In the step S1200, based on the vehicle position information, the vehicle speed information and the vibration information of the running record database, if the processing portion 16 of the server apparatus 200 finds out that the navigation apparatus 100 detects continuously vibration in various directions in an area despite a very low vehicle speed, the processing portion 16 determines that there is a high probability of occurrence of an earthquake in the area, and goes to the step S1201.

In the step S1201, the processing portion 16 specifies a destination address that includes a group address allocated to the radio communication apparatus 300 that corresponds to the area, and an address which presents all the identification addresses of the navigation apparatuses that are connected to the radio communication apparatus 300, and transmits warning information via the radio communication apparatus 300. In the step S1202, in all the navigation apparatuses 100 which in preparing the connection, obtains a communication address that includes the group address and the identification address and are connected to the radio communication apparatus 300, the processing portion 12 receives the warning information together with the destination address via the transmitter-receiver portion 3. In the step S1203, the processing portion 12 understands based on the destination address and on the obtained communication address that the warning information is for itself, generates a display signal based on the warning information, and makes the display 7 display a message (e.g., "Original Detection Information: An earthquake is highly probable in Kita Ward, Osaka City! Watch out when running.") which warns of a highly probable earthquake. The warning message may be released from the speaker 8 by voice.

As described above, if an earthquake occurs, the radio communication apparatus 300 corresponding to the area where the earthquake has occurred is selected, waning information is simultaneously transmitted from the selected radio communication apparatus 300 to each navigation apparatus 100, and a warning notice is transmitted from each navigation apparatus 100, thereby it is possible to warn the contractors that are running in and near the area.

Figure 13:
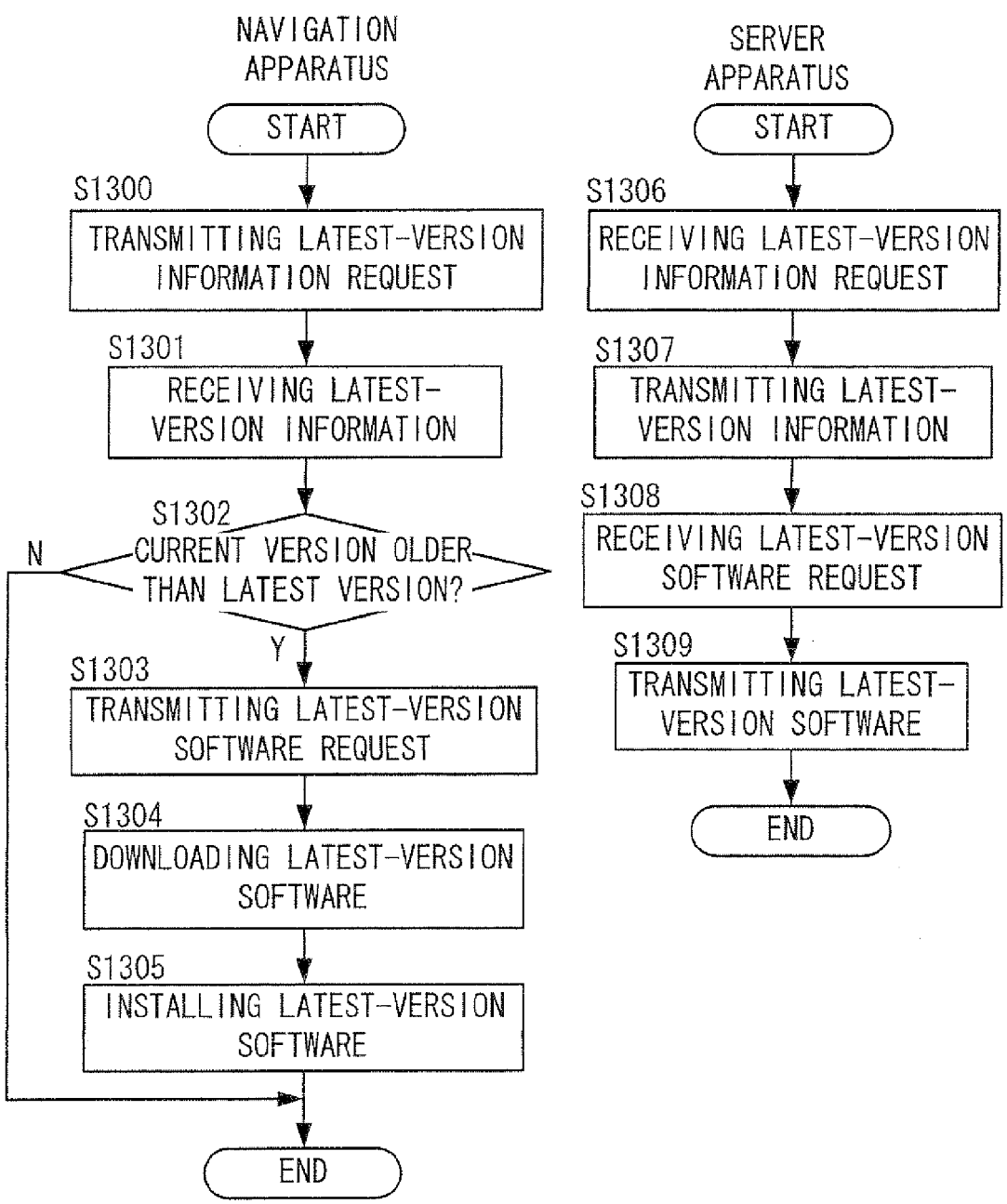
FIG. 13 is a flow chart on an example user interface update by software download in the present invention.

[User Interface Update] Next, an example update operation of user interface is explained using the flow chat shown in FIG. 13.

To begin with, in the step S1300, the processing portion 12 of the navigation apparatus 100 transmits a latest-version information request to the radio communication apparatus 300 via the transmitter-receiver portion 3. In the step S1306, the processing portion 16 of the server apparatus 200 receives the latest-version information request via the radio communication apparatus 300, and in the step S1307, the processing portion 16 transmits the latest-version information to the transmitter-receiver portion 3 via the radio communication apparatus 300.

In the step S1301, the processing portion 12 receives the latest-version information via the transmitter-receiver portion 3. In the step S1302, the processing portion 12 determines whether or not the current version of user interface is older than the latest version presented by the latest-version information, and if it is determined that the current version is older than the latest version (Y in the step S1302), the processing portion 12 goes to the step S1303. If it is determined that the current version is not older than the latest version (N in the step S1302), the operation is terminated.

In the step S1303, the processing portion 12 transmits a latest-version software request to the radio communication apparatus 300 via the transmitter-receiver portion 3. In the step S1308, the processing portion 16 receives the latest-version software request via the radio communication apparatus 300, and in the step S1309, the processing portion 16 transmits the latest-version software to the transmitter-receiver portion 3 via the radio communication apparatus 300.

In the step S1304, the processing portion 12 receives the latest-version software via the transmitter-receiver portion 3, and makes the storage medium 6 store the received latest-version software. In the step S1305, the processing portion 12 confirms by CRC (Cyclic Redundancy Check) and the like that the latest-version software has no problem, and installs the latest-version software to update the user interface. Thus, it is possible for the user to take advantage of the latest user interface.

Figure 14:
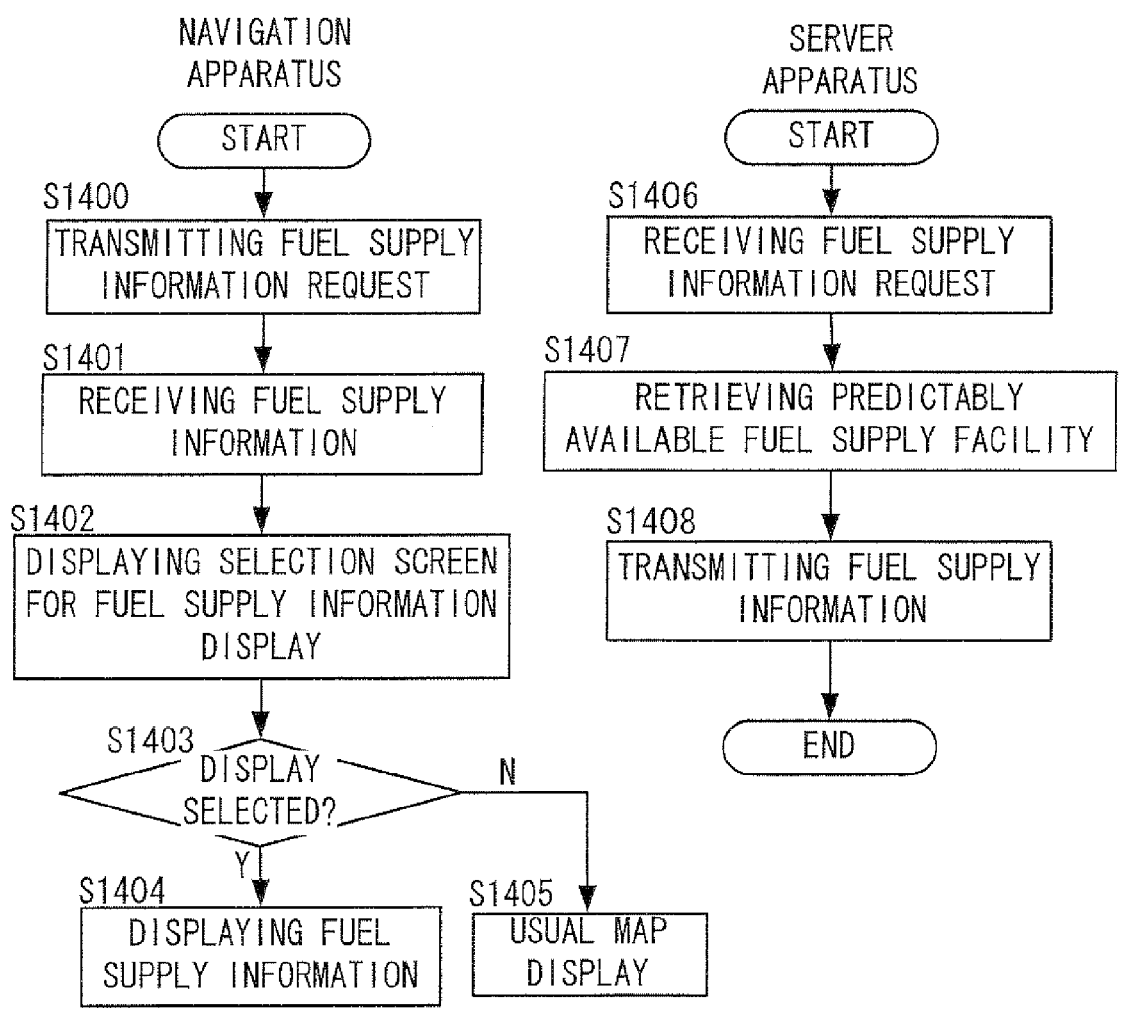
FIG. 14 is a flow chart on an example delivery of fuel supply information in the present invention.

[Fuel Supply Information Delivery] Next, an example delivery of fuel supply information from the server apparatus at the time when fuel is running out is explained using the flow chart shown in FIG. 14.

In the above navigation operation shown in FIG. 2, it is assumed that in the steps S202 and S205, the processing portion 12 of the navigation apparatus 100 transmits a map information request including the vehicle speed information and fuel amount information together with the vehicle position information. It is also assumed that in the steps S209 and S211, the processing portion 16 of the server apparatus 200 obtains the vehicle speed information and the fuel amount information when the processing portion 16 receives the map information request, and in the step S211, the processing portion 16 calculates the average vehicle speed based on the vehicle speed information and calculates an accumulated running distance based on the vehicle position information.

In this navigation operation, if the processing portion 12 determines that a fuel amount detected by a fuel amount sensor is equal to or less than a given amount, operation presented by the flow chart shown in FIG. 14 is started.

To begin with, in the step S1400, the processing portion 12 of the navigation apparatus 100 transmits a fuel supply information request to the radio communication apparatus 300 via the transmitter-receiver portion 3. In the step S1406, the processing portion 16 of the server apparatus 200 receives the fuel supply information request via the radio communication apparatus 300, and goes to the step S1407.

In the step S1407, the processing portion 16 calculates a mileage based on the first obtained fuel amount information, the latest obtained fuel amount information and on the accumulated running distance, and calculates a predictable possible-to-run distance based on the latest obtained fuel amount information and on the calculated mileage. And, from a fuel supply facility database that is stored in the storage portion 13, the processing portion 16 retrieves fuel supply facilities that are present within the calculated predictable possible-torun distance from the position presented by the latest obtained vehicle position information. Here, the fuel supply facility database is a database that contains the name information, position information and business time information of each fuel supply facility. A service provider of each facility is able to register the business time information via the Internet 400 by operating the terminal 500. The processing portion 16 calculates a predictable running time based on the distance of the route that extends from the position presented by the latest obtained vehicle position information to the retrieved fuel supply facility and on the average vehicle speed. And, from the retrieved fuel supply facilities, the processing portion 16 retrieves further a fuel supply facility where the time when the calculated predictable running time elapses from the current time falls within the business time of the fuel supply facility presented by the business time information.

In the step S1408, the processing portion 16 transmits the fuel supply information, that is, the name information and position information of the retrieved fuel supply facility and the route information that presents the route to the retrieved fuel supply facility together with the information on the calculated predictable possible-to-run distance to the transmitter-receiver portion 3 of the navigation apparatus 100 via the radio communication apparatus 300.

In the step S1401, the processing portion 12 of the navigation apparatus 100 receives the fuel supply information and the predictable possible-to-run distance information via the transmitter-receiver portion 3, and makes the storage medium 6 store them. Then, in the step S1402, the processing portion 12 generates a display signal, and makes the display 7 display a selection screen for fuel supply information display. The selection screen for fuel supply information display is a screen where a message, for example, "The fuel is running out. The predictable possible-to-run distance: about X X km. Display of the fuel supply facility and of the route needed?" is displayed. The predictable possible-to-run distance is displayed based on the predictable possible-to-run distance information stored in the storage medium 6.

If the display of the fuel supply information is selected on the selection screen for fuel supply information display by operating the operation portion 9 (Y in the step S1403), the processing portion 12 goes to the step S1404, generates a display signal based on the fuel supply information and map information stored in the storage portion 6 and on the calculated vehicle position, and makes the display 7 add and display the mark and name of the fuel supply facility, the route to the fuel supply facility, and the vehicle position on the map. Thus, the contractor can understand the fuel supply facility where it is predictably possible to reach within the business time on the fuel of the current amount and the route to the fuel supply facility, and can surely supply fuel using the fuel supply facility. In addition, because the business time information can be registered from the terminal 500, the fuel supply information can be provided based the latest business time information, thereby the contractor can more surely use the fuel supply facility.

If the non-display of the fuel supply information is selected on the selection screen for fuel supply information display by operating the operation portion 9 (N in the step S1403), the processing portion 12 goes to the step S1405, generates a display signal based on the map information stored in the storage portion 6 and on the calculated vehicle position, and starts to make the display 7 display the map and the vehicle position, thereby usual navigation display is started.

Here, the navigation apparatus 100 obtains the fuel supply information in advance, and the selection screen for fuel supply information display is displayed, thereby the contractor can watch the display of fuel supply information as soon as the display of the fuel supply information is selected.

Figure 15:
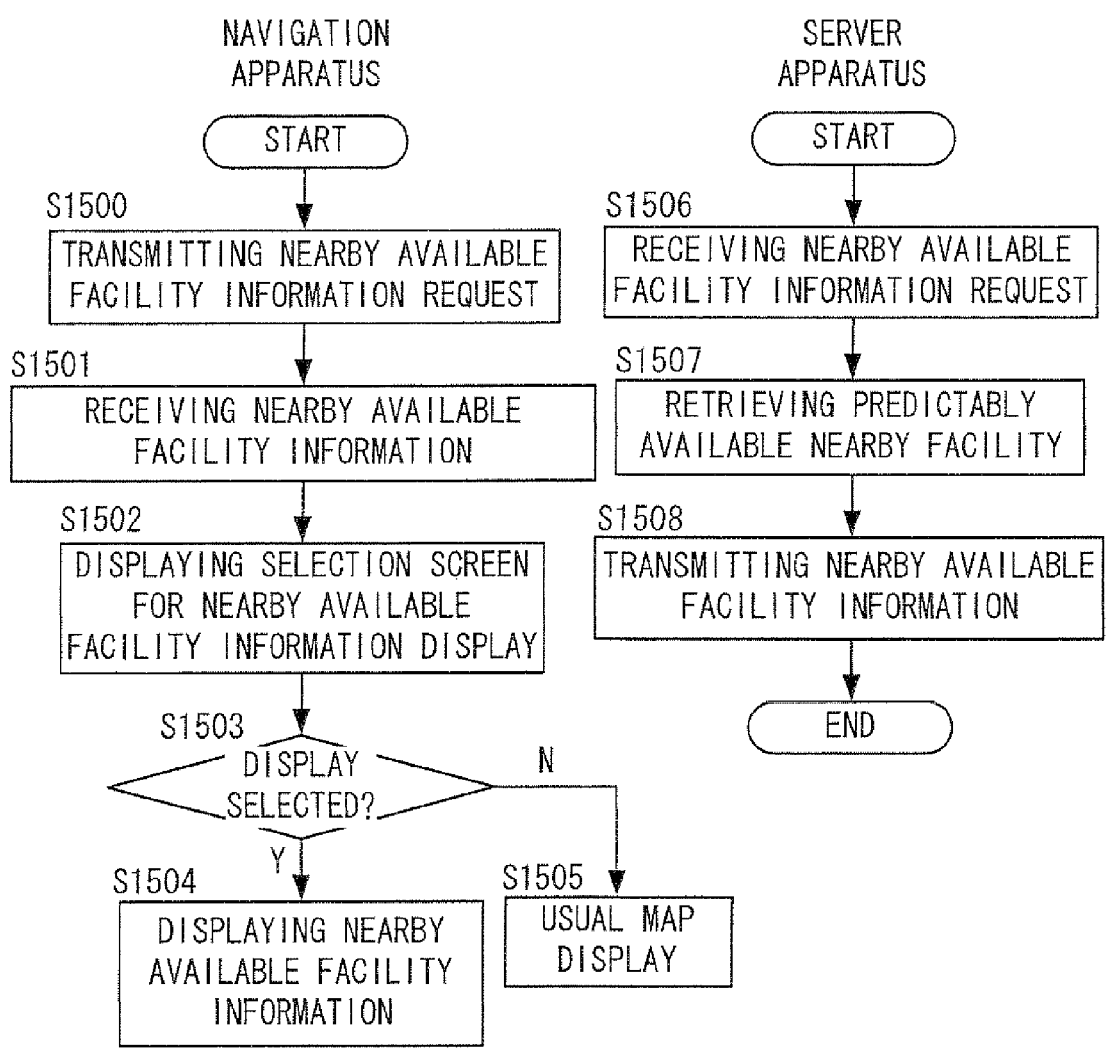
FIG. 15 is a flow chart on an example delivery of nearby available facility information in the present invention.

[Delivery Of Nearby Available Facility Information] Next, an example delivery of nearby available facility information from the server apparatus at a request from a contractor is explained using the flow chart shown in FIG. 15.

In the above navigation operation shown in FIGS. 2 and 3, it is assumed that in the steps S202 and S206, the processing portion 12 of the navigation apparatus 100 transmits a map information request including the vehicle speed information and fuel amount information together with the vehicle position information. It is also assumed that in the steps S209 and S211, the processing portion 16 of the server apparatus 200 obtains the vehicle speed information and the fuel amount information when the processing portion 16 receives the map information request, and in the step S211, the processing portion 16 calculates the average vehicle speed based on the vehicle speed information, and calculates an accumulated running distance based on the vehicle position information.

In this navigation operation, operation for a nearby available facility information request including specification of the category (e.g., restaurant, convenience store and the like) of a facility is carried out on the operation portion 9, operation presented by the flow chart shown in FIG. 15 is started.

To begin with, in the step S1500, the processing portion 12 of the navigation apparatus 100 transmits a nearby available facility information request to the radio communication apparatus 300 via the transmitter-receiver portion 3. In the step S1506, the processing portion 16 of the server apparatus 200 receives the nearby available facility information request via the radio communication apparatus 300, and goes to the step S1507.

In the step S1507, the processing portion 16 calculates a mileage based on the first obtained fuel amount information, the latest obtained fuel amount information and on the accumulated running distance, and calculates a predictable possible-to-run distance based on the latest obtained fuel amount information and on the calculated mileage.

If the calculated predictable possible-to-run distance is equal to or longer than a given distance (e.g., 1 km) that presents a short distance, from a various-facilities database that is stored in the storage portion 13, the processing portion 16 retrieves facilities that are present within the given distance from the position presented by the latest obtained vehicle position information and belong to the specified category. Here, the various-facilities database is a database that contains the category information, name information, position information and business time information of each facility. A service provider of each facility is able to register the business time information via the Internet 400 by operating the terminal 500. The processing portion 16 calculates a predictable running time based on the distance of the route that extends from the position presented by the latest obtained vehicle position information to the retrieved facility and on the average vehicle speed. And the processing portion 16 retrieves further from the retrieved facilities a facility where the time when the calculated predictable running time elapses from the current time falls within the business time of the facility presented by the business time information.

If the calculated predictable possible-to-run distance is shorter than the given distance, from the various-facilities database that is stored in the storage portion 13, the processing portion 16 retrieves facilities that are present within the calculated predictable possible-to-run distance from the position presented by the latest obtained vehicle position information and belong to the specified category. The processing portion 16 calculates a predictable running time based on the distance of the route that extends from the position presented by the latest obtained vehicle position information to the retrieved facility and on the average vehicle speed. And the processing portion 16 retrieves further from the retrieved facilities a facility where the time when the calculated predictable running time elapses from the current time falls within the business time of the facility presented by the business time information.

In the step S1508, the processing portion 16 transmits the nearby available facility information, that is, the name information and position information of the retrieved facility and the route information that presents the route to the retrieved facility to the transmitter-receiver portion 3 of the navigation apparatus 100 via the radio communication apparatus 300.

In the step S1501, the processing portion 12 of the navigation apparatus 100 receives the nearby available facility information via the transmitter-receiver portion 3, and makes the storage medium 6 store the nearby available facility information. Then, in the step S1502, the processing portion 12 generates a display signal, and makes the display 7 display a selection screen for nearby available facility information display. The selection screen for nearby available facility information display is a screen where a message, for example, "The inquiry is completed. Display of the nearby available facility and of the route needed?" is displayed.

If the display of the nearby available facility information is selected on the selection screen for nearby available facility information display by operating the operation portion 9 (Y in the step S1503), the processing portion 12 goes to the step S1504, generates a display signal based on the nearby available facility information and map information stored in the storage portion 6 and on a calculated vehicle position, and makes the display 7 add and display the mark and name of the nearby available facility, the route to the nearby available facility, and the vehicle position on the map. Thus, the contractor can understand the nearby available facility in the desired category where it is predictably possible to reach within the business time on the fuel of the current amount, and can surely use the facility. In addition, because the business time information can be registered from the terminal 500, the nearby available facility information can be provided based the latest business time information, thereby the contractor can more surely use the facility.

If the non-display of the nearby available facility information is selected on the selection screen for nearby available facility information display by operating the operation portion 9 (N in the step S1503), the processing portion 12 goes to the step S1505, generates a display signal based on the map information stored in the storage portion 6 and on the calculated vehicle position, and starts to make the display 7 display the map and the vehicle position, thereby usual navigation display is started.

Here, the navigation apparatus 100 obtains the nearby available facility information in advance, and the selection screen for nearby available facility information display is displayed, thereby the contractor can watch the display of nearby available facility information as soon as the display of the nearby available facility information is selected.

The embodiments described above are only examples to put the present invention into practical use, and any modifications can be made without departing from the spirit of the present invention. For example, the present invention can also be applied to a pedestrian navigation system that uses a mobile phone having a GPS (Global Positioning System) function and to a PND (Personal Navigation Device) that is an electronic portable GPS navigation apparatus.

What is claimed is:

1. A server apparatus comprising a server storage in which a map information database is stored therein,
   wherein the server apparatus is arranged to
      receive a map information request from a navigation apparatus by radio communication, the map information request including a mobile-body position,
      transmit a map information to the navigation apparatus by the radio communication, the map information being based on the received mobile-body position,
      determine whether a contractor vehicle is by a road not present in the map information database,
      provisionally confirm that the road is a new road through processing an image of the road taken by the contractor vehicle, and
      reconfirm that the road is the new road through processing an image of the road taken by another contractor vehicle.

2. The server apparatus according to claim 1, wherein the server apparatus is arranged to:
   receive an additional map information request from the navigation apparatus, the additional map information request including an updated mobile-body position,
   determine whether it is necessary to provide the additional map information based on the updated mobile-body position, and
   retrieve and transmit the additional map information to the navigation apparatus based on a determination that it is necessary to provide the additional map.

\* \* \* \* \*